(12) United States Patent
Batchelder et al.

(10) Patent No.: US 9,527,672 B2
(45) Date of Patent: Dec. 27, 2016

(54) CLEANABLE CONVEYOR FRAME ASSEMBLY INCLUDING SNAP-ON COMPONENTS

(71) Applicant: Laitram, L.L.C., Harahan, LA (US)

(72) Inventors: Jeff Batchelder, Grand Haven, MI (US); Michael Hendrik DeGroot, Rockford, MI (US); Friso Antonius Maria Oonk, Vragender (NL); Laurentius G. J. Wolters, Lichtenvoorde (NL); James R. Honeycutt, Jr., Grandville, MI (US); Edward T. Mol, Marne, MI (US); Angela Longo Marshall, Harahan, LA (US); Gilbert J. MacLachlan, Harahan, LA (US); Joseph M. DePaso, River Ridge, LA (US); Timothy J. DeRoche, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/602,741

(22) Filed: Jan. 22, 2015

(65) Prior Publication Data
US 2015/0210478 A1    Jul. 30, 2015

Related U.S. Application Data

(60) Provisional application No. 61/931,066, filed on Jan. 24, 2014.

(51) Int. Cl.
*B65G 21/08*    (2006.01)
*B65G 21/06*    (2006.01)

(52) U.S. Cl.
CPC ................... *B65G 21/06* (2013.01)

(58) Field of Classification Search
CPC ................ B65G 21/02; B65G 21/06
USPC ............................ 198/860.1, 861.1
See application file for complete search history.

(56) References Cited

U.S. PATENT DOCUMENTS

| | | | |
|---|---|---|---|
| 5,421,451 A | 6/1995 | Easton | |
| 8,408,385 B2* | 4/2013 | Swinderman | B65G 21/02 198/860.1 |
| 8,562,241 B2* | 10/2013 | Klepack | B65G 21/02 198/860.1 |
| 8,973,739 B2 | 3/2015 | Zieger | |
| 2002/0148709 A1* | 10/2002 | Claig | B65G 21/2072 198/860.1 |
| 2005/0115809 A1* | 6/2005 | Lutz | B65G 13/12 198/860.1 |
| 2005/0121294 A1 | 6/2005 | Finger et al. | |
| 2006/0049023 A1 | 3/2006 | Dietsch et al. | |

(Continued)

FOREIGN PATENT DOCUMENTS

WO    2010068966 A1    6/2010

OTHER PUBLICATIONS

International Search Report and Written Opinion of the International Searching Authority, PCT/US15/012560, mailed May 29, 2015, Korean Intellectual Property Office, Republic of Korea.

*Primary Examiner* — James R Bidwell
(74) *Attorney, Agent, or Firm* — Catherine M. Bishop

(57) ABSTRACT

A cleanable belt conveyor and a method for making a cleanable belt conveyor having a simplified frame design. The conveyor includes at least one toolbar and one or more auxiliary components mounted to the toolbar using a snap clamp having a protrusion that mates with a channel on the toolbar.

16 Claims, 32 Drawing Sheets

(56) References Cited

U.S. PATENT DOCUMENTS

| | | | |
|---|---|---|---|
| 2006/0070859 A1* | 4/2006 | Pahlow | B65G 15/10 198/809 |
| 2006/0237292 A1 | 10/2006 | Ryan | |
| 2006/0237293 A1 | 10/2006 | Karpy | |
| 2007/0119362 A1 | 5/2007 | Piedmont | |
| 2013/0153374 A1* | 6/2013 | Bhosale | B65G 41/00 198/860.1 |
| 2015/0210475 A1* | 7/2015 | Batchelder | B65G 15/62 198/497 |

* cited by examiner

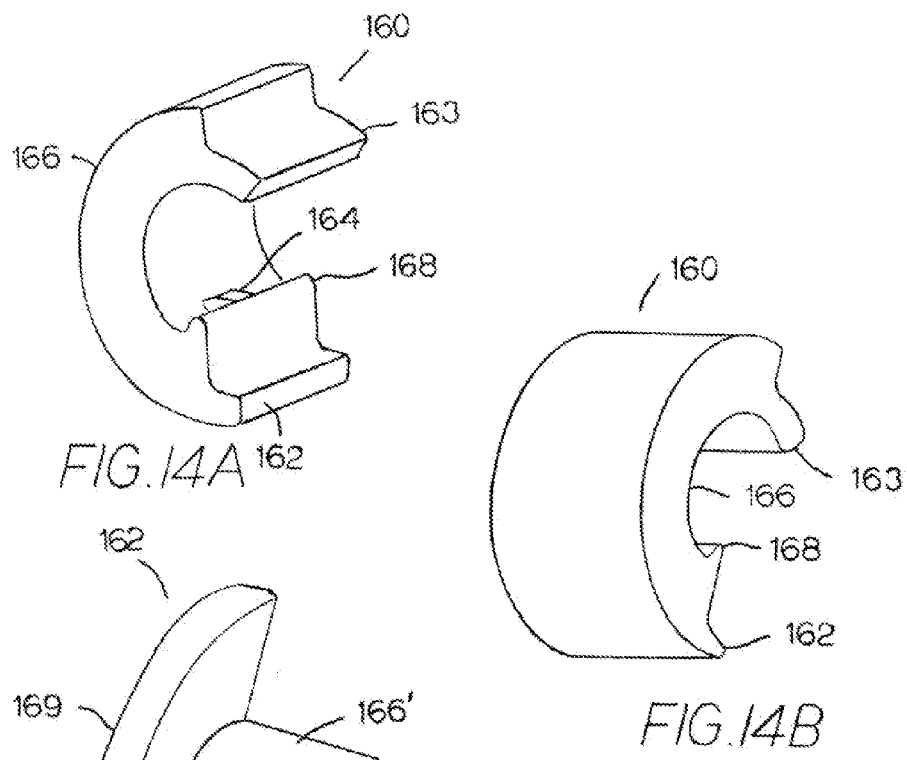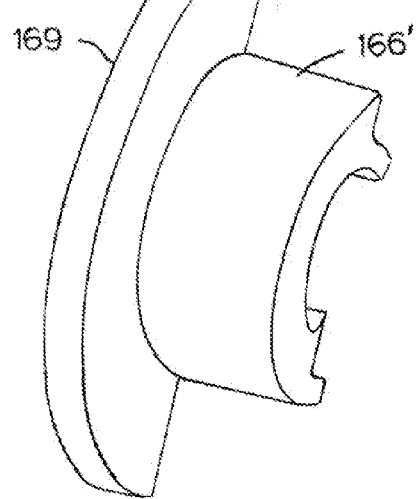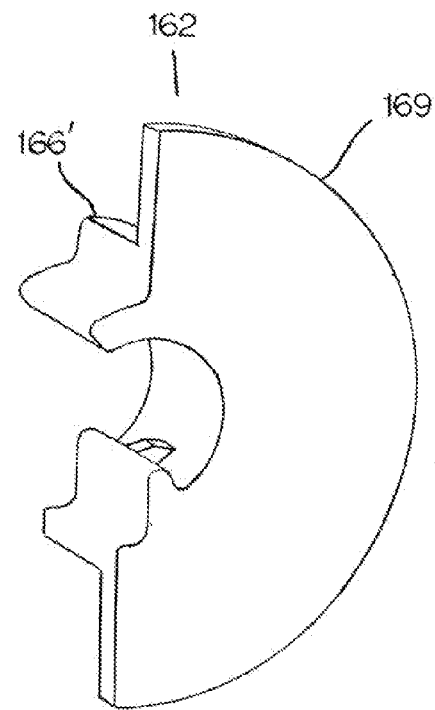

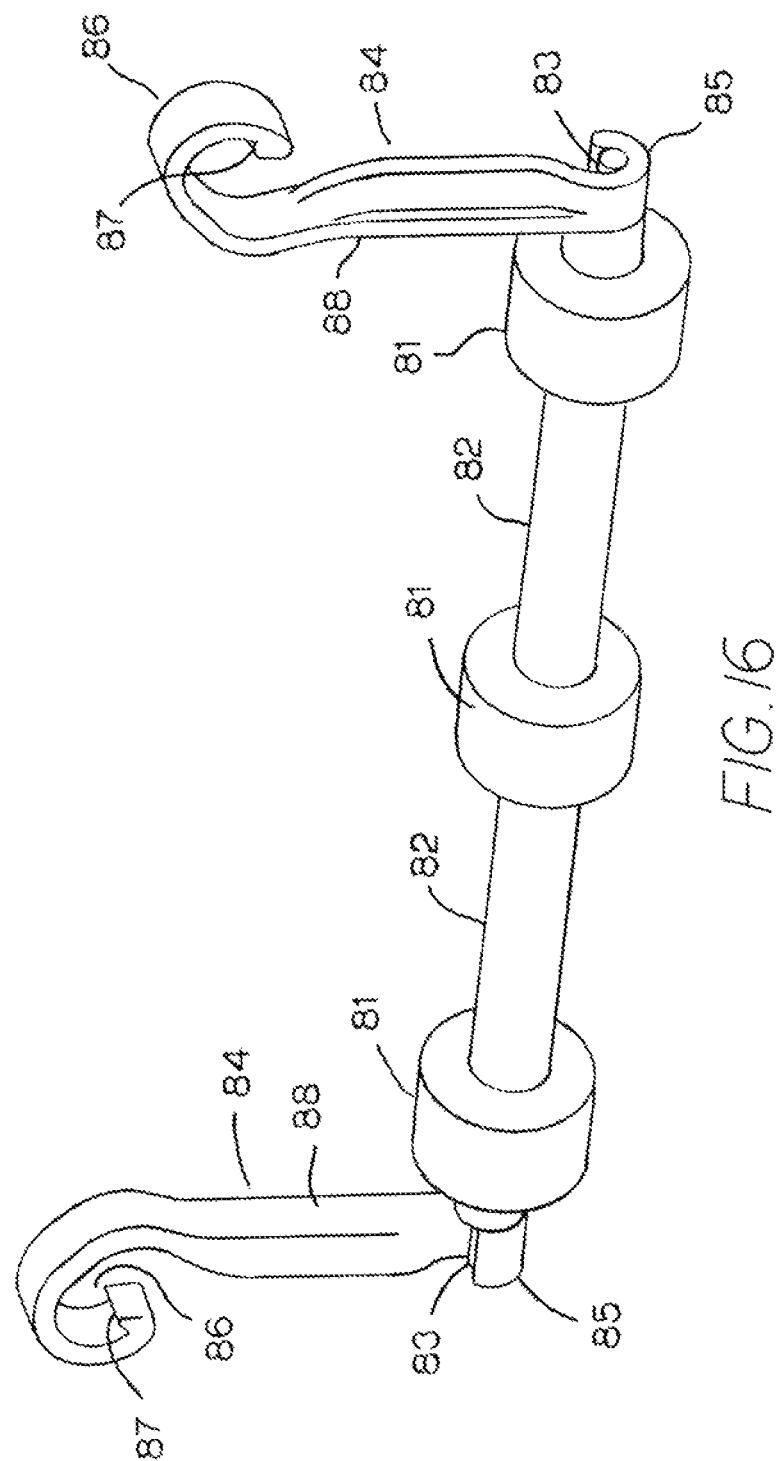

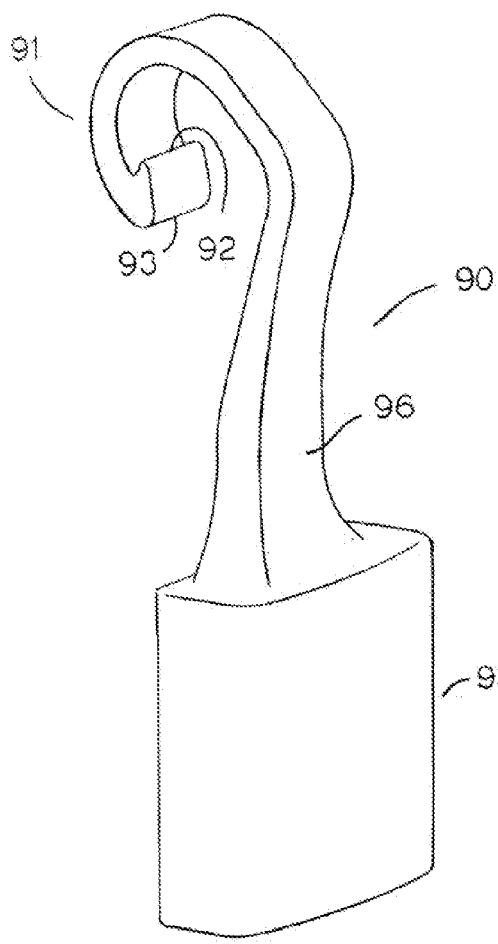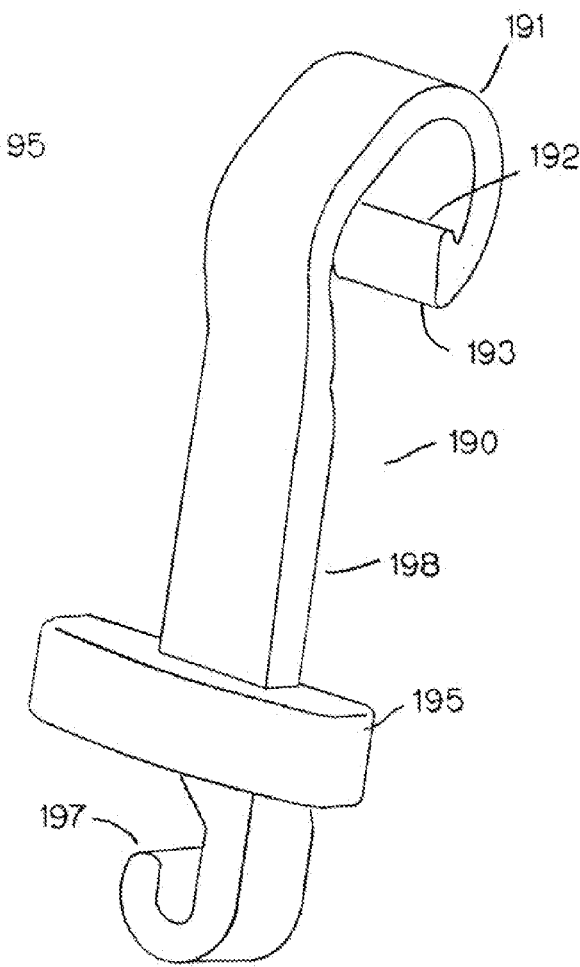
FIG. 17
FIG. 18

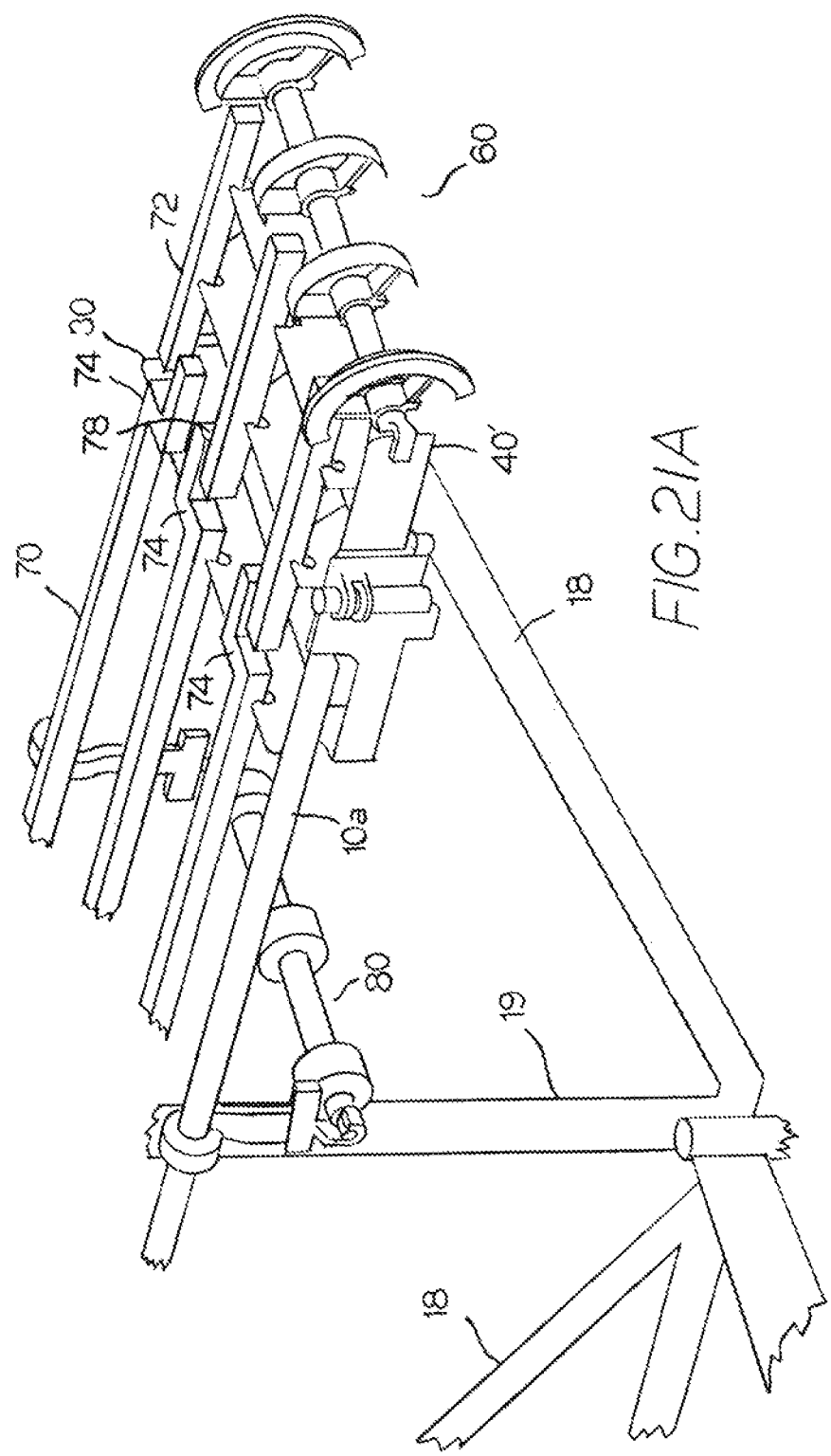

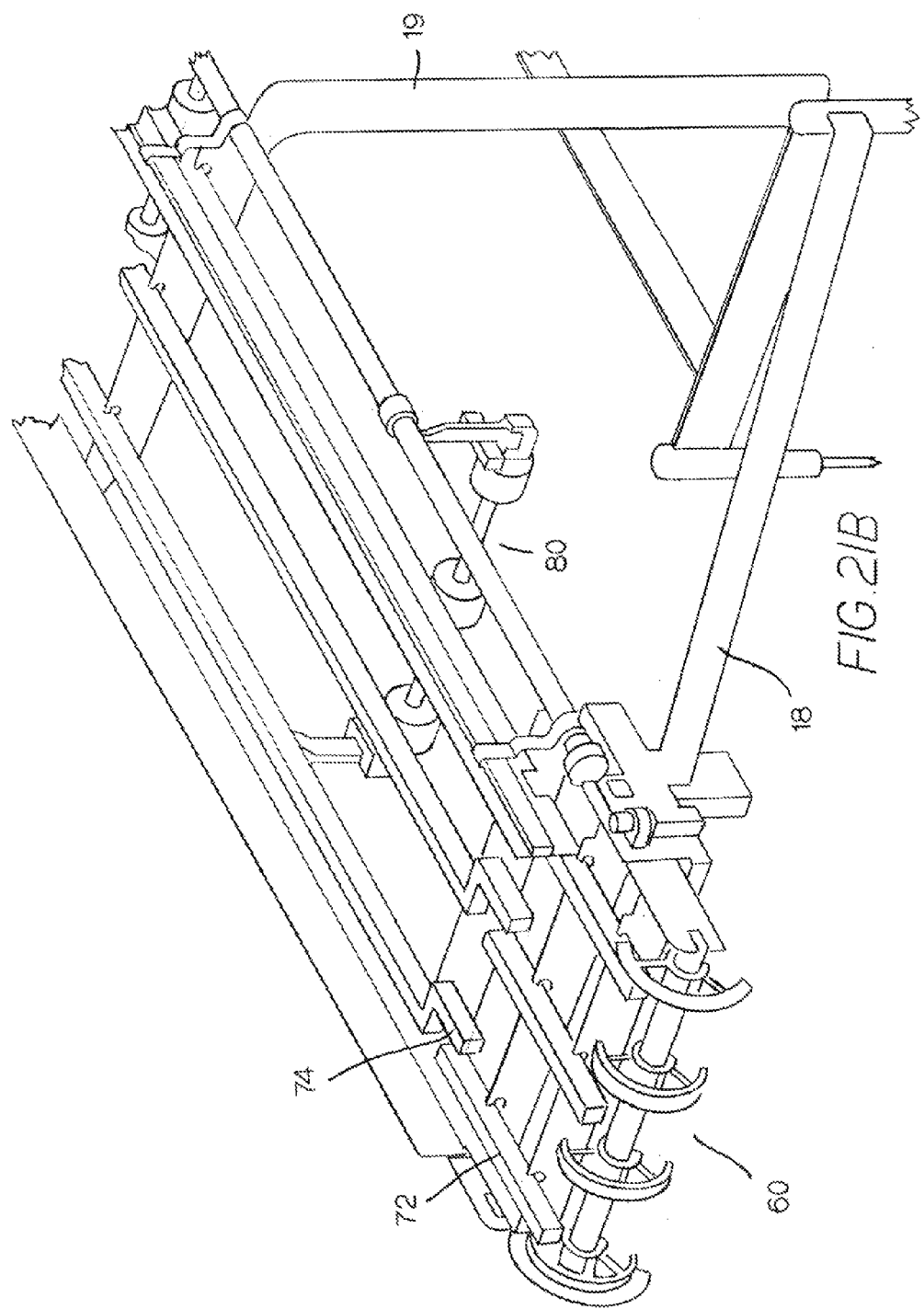

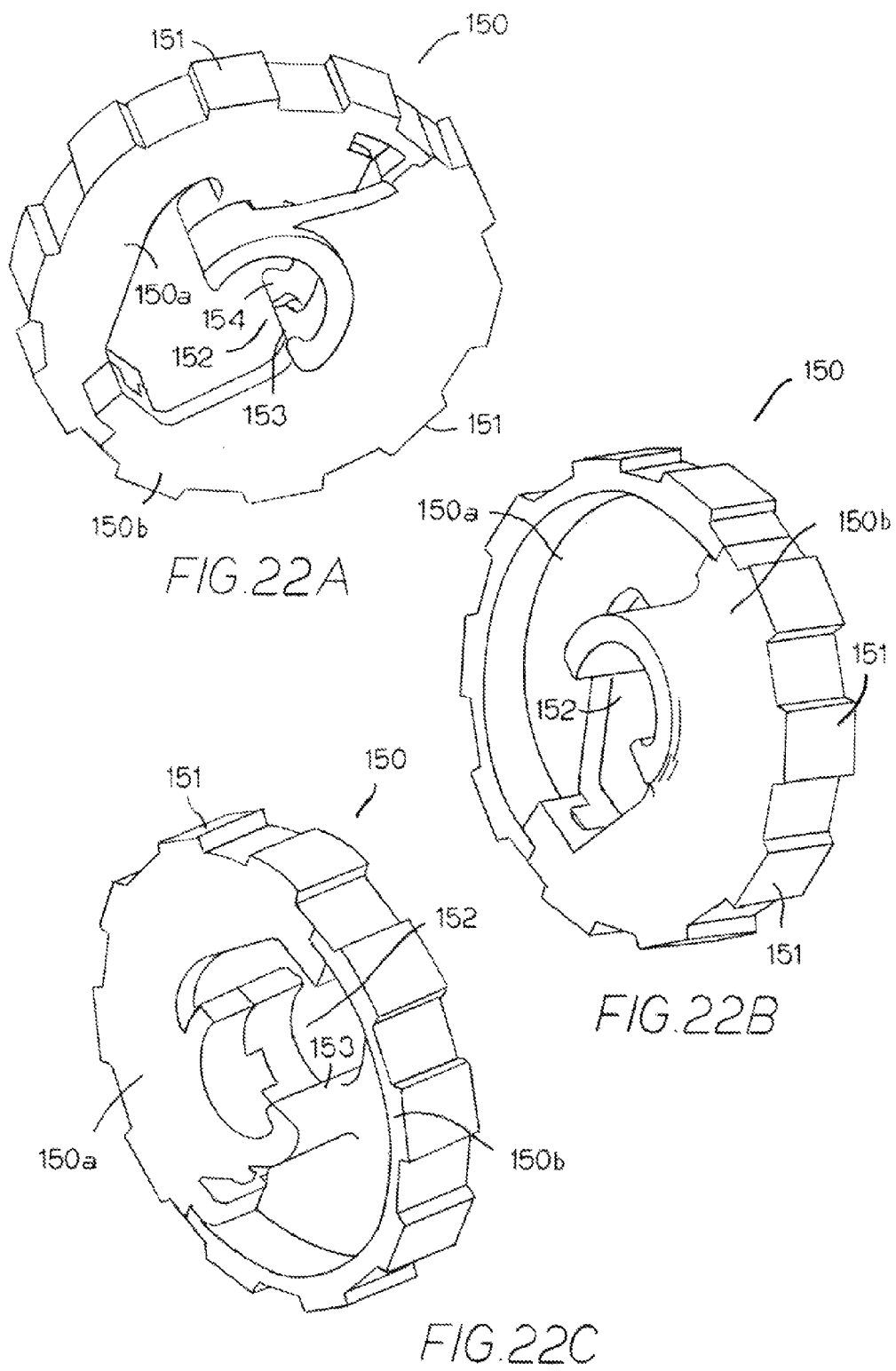

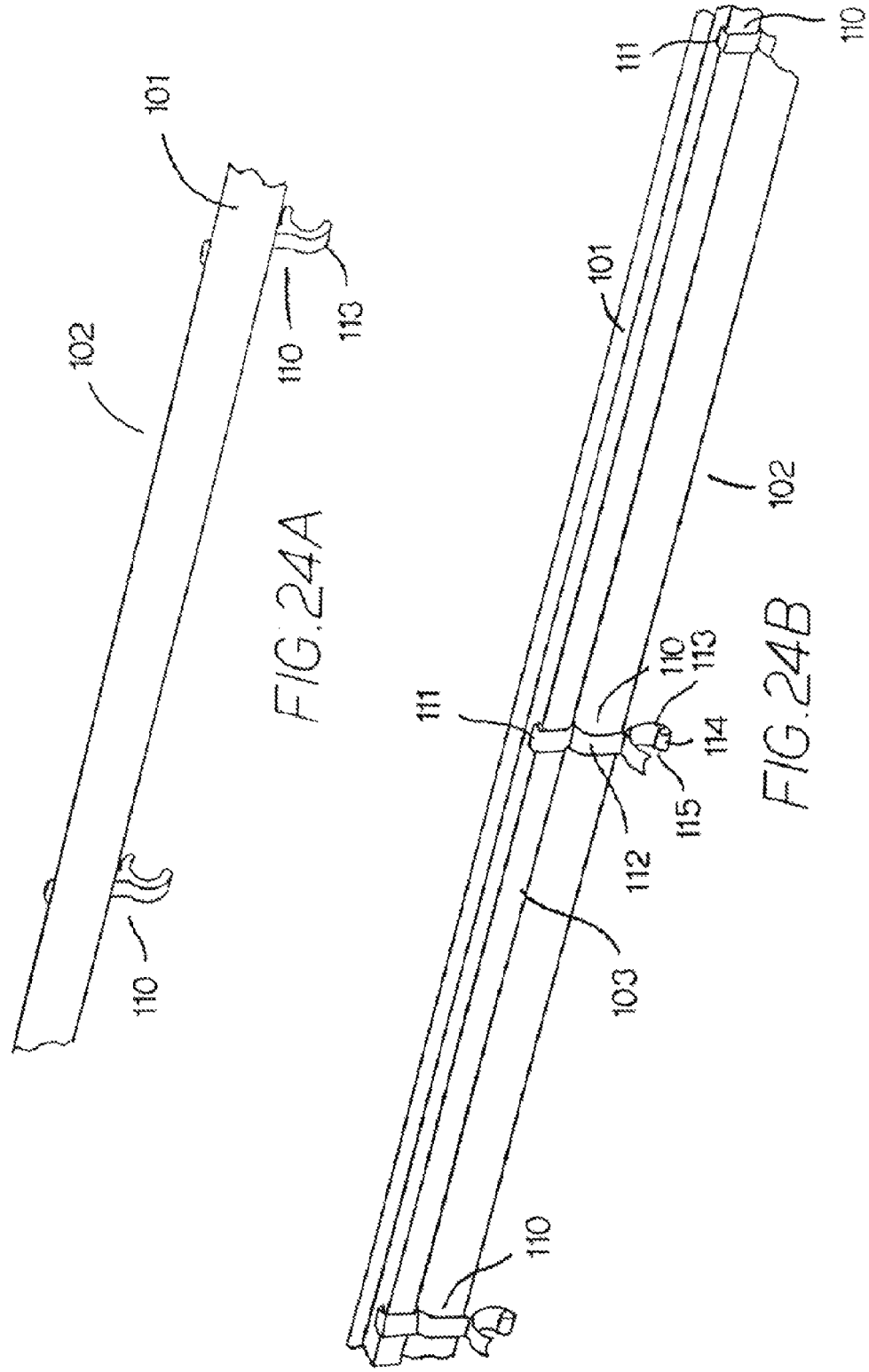

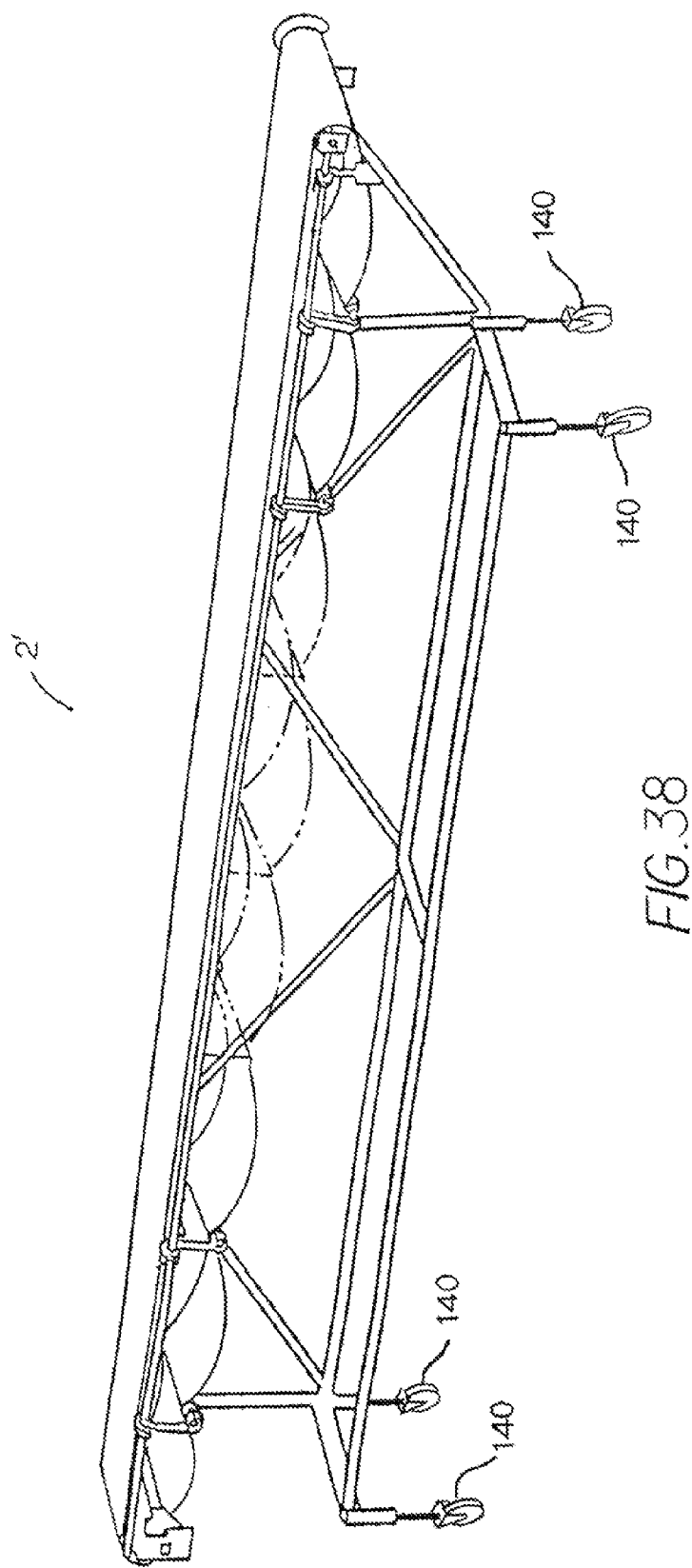

CLEANABLE CONVEYOR FRAME ASSEMBLY INCLUDING SNAP-ON COMPONENTS

RELATED APPLICATIONS

The present application claims priority to U.S. Provisional Patent Application No. 61/931,066, filed Jan. 24, 2014 and entitled "Cleanable Conveyor Frame Assembly Including Snap-On Components", the contents of which are incorporated herein by reference. The present application relates to U.S. Provisional Patent Application No. 62/061,346, filed Oct. 8, 2014, entitled "Snap-On Position Limiter for a Conveyor Belt" and its subsequent U.S. non-provisional application Ser. No. 14/602,455, filed Jan. 22, 2015 the contents of which are also herein incorporated by reference.

BACKGROUND

The invention relates generally to frames for power-driven conveyors and more particularly to belt conveyor frames that are easy to clean.

In the meat, poultry, fruit, and vegetable industries, conveyor belts are used to transport food products. Most conveyor belts are supported along carryways supported by a frame assembly. To meet USDA sanitation requirements, conveyor belt systems must be cleanable. The conveyor carryway and frame are particularly susceptible to the accumulation of fats, dirt, and debris. Complex connections between different components, a large number of components in the frame and carryway, difficult-to-clean crevices and other issues make cleaning conveyor belt systems problematic at times. In addition, current conveyor systems are difficult to assemble and disassemble to replace and—or clean components.

Thus, there is a need for an easy-to-clean, hygienic conveyor belt system.

SUMMARY

This need and other needs are addressed by a conveyor system embodying features of the invention. The conveyor system includes a frame having one or more toolbars comprising a shaft with a channel. Snap-on auxiliary components are incorporated into the conveyor by locking onto a toolbar with a snap clamp having a protrusion that engages the channel.

According to one aspect of the invention, a conveyor frame comprises a first longitudinally-extending toolbar extending from a first end to a second end, a plurality of brackets connected to the first longitudinally-extending toolbar, support structure for the toolbar and an auxiliary component mounted to the first longitudinally-extending toolbar using a snap clamp.

According to another aspect of the invention, a conveyor frame comprises a first toolbar comprising a shaft and a channel extending longitudinally along at least a portion of the shaft perimeter, and an auxiliary component mounted to the toolbar using a snap clamp. The snap clamp comprising a collar having an inner surface, a first tip and a second tip, the second tip including a protrusion configured to mate with the channel.

According to another aspect, a snap clamp for mounting a component to a shaft comprises a curved body having a first leg and a second leg, the second leg terminating in a tapered tip and a protrusion extending inwards from the tapered tip.

BRIEF DESCRIPTION OF THE DRAWINGS

These aspects and features of the invention are described in more detail in the following description, appended claims, and accompanying drawings, in which:

FIGS. 14A and 14B show another embodiment of an infeed shoe suitable for mounting to a toolbar in a conveyor frame according to one embodiment of the invention;

FIGS. 15A and 15B show another embodiment of an edge infeed shoe suitable for mounting to a toolbar in a conveyor frame according to one embodiment of the invention;

FIG. 16 shows an embodiment of a returnway roller assembly suitable for mounting to a toolbar in a conveyor frame according to one embodiment of the invention;

FIG. 17 shows an embodiment of a containment block suitable for mounting to a toolbar in a conveyor frame according to one embodiment of the invention;

FIG. 18 shows another embodiment of a containment block suitable for mounting to a toolbar in a conveyor frame according to an embodiment of the invention;

FIGS. 21A and 21B show an end of a conveyor frame including the wearstrip locks of FIGS. 19 and 20;

FIGS. 22A, 22B and 22C are different views of a lock-in-place split sprocket suitable for mounting to a toolbar in a conveyor frame according to an embodiment of the invention;

FIGS. 24A and 24B show sidewall assemblies suitable for mounting to a toolbar in a conveyor frame according to an embodiment of the invention;

FIG. 38 shows a conveyor frame with sanitary wheels.

DETAILED DESCRIPTION

A sanitary conveyor comprises a frame and a plurality of auxiliary components that may be removably mounted to the frame to allow easy cleaning and reconfiguration of the conveyor. The auxiliary components may be installed, retained and removed from the frame without the use of tools, or with minimal use of tools. Embodiments of the invention employ a snap clamp having an anchor, such as a protrusion that engages a channel in a shaft of the conveyor, referred to as a toolbar. A body of the snap clamp mates with the body of the shaft. Optionally, an axial tab engages a notch or other seat in the shaft of the toolbar. The relaxed body of the snap clamp may be different than the shaft, but stretched or compressed to match the shaft and lock into place. The snap clamp may be used to interchangeably mount components to the shaft while locking the components axially and-or radially relative to the shaft during operation. The lock-in place design of the auxiliary components enables assembly on a shaft without fasteners or other tools. The invention will be described below relative to certain illustrative embodiments, though the invention is not limited to the illustrative embodiments.

Figure 1:
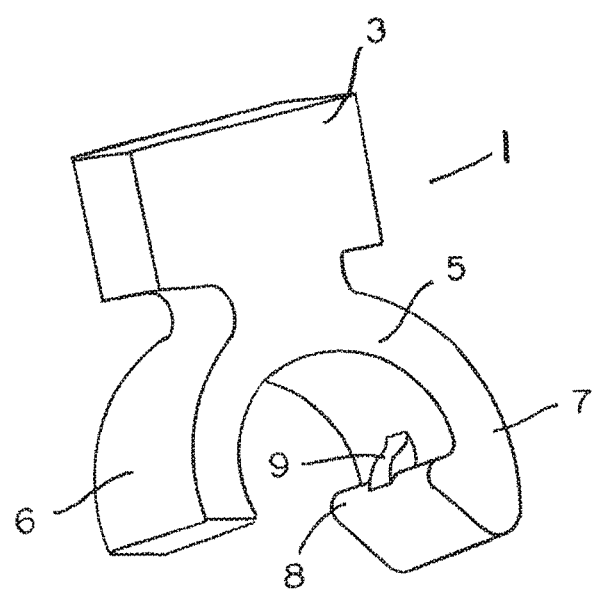
FIG. 1 is a schematic view of a genericized conveyor component including a snap clamp for attaching the conveyor component to a conveyor frame.
Figure 2:
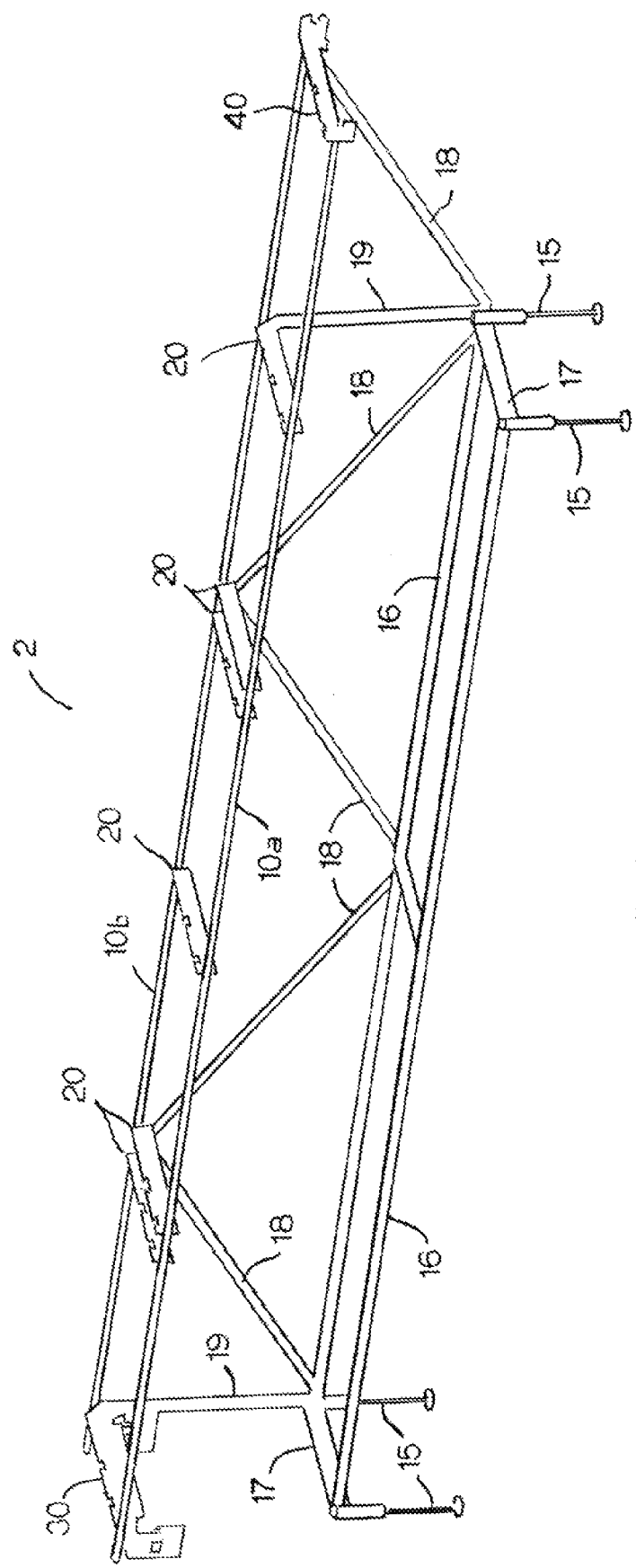
FIG. 2 shows a conveyor frame including toolbars according to an embodiment of the invention.

FIG. 1 a schematic diagram of a generalized conveyor component 1 including a snap clamp for attaching the conveyor component to a conveyor frame. The conveyor component 1 includes a functional portion 3 for performing some function in a conveying system and a snap clamp 4 for integrating the conveyor component into a conveyor frame. The snap-clamp 4 comprises a body 5 including legs 6, 7. The illustrative body 5 is semi-annular and designed to engage a shaft, such as a toolbar, on a conveyor frame. The resting shape of the body 5, can be different from toolbar shape and is flexible to allow stretching or compression to snap the snap clamp into place on a corresponding shaft. The first leg 6 terminates in a flat end surface while the second leg 7 terminates in a barbed tip 8 for anchoring the snap clamp. The barbed tip 8 engages a channel or other feature on a toolbar. A tab 9 extends between the radially inner surface of the clamp and the barbed tip 8. The tab 9 matches a recess on a corresponding shaft, as described below.

The stiffness and tension of the snap clamp 4 may be varied depending on the material used, thickness of the legs, degree of wrap of the gripping element and other factors that may be varied.

As described below, the functional portion of the conveyor component may have any suitable size, shape and configuration suitable for performing a selected task. In addition, novel snap clamp design may be employed to mount any type of component to a shaft, not limited to conveyor components.

Referring to FIGS. 2-10B, a sanitary conveyor 2 of one embodiment of the invention includes a frame base, a plurality of toolbars 10, including a pair of spaced-apart parallel toolbars forming each side of the frame, and a plurality of lock-in-place auxiliary components mounted to the toolbars or frame components.

The frame minimizes components through simplification and integration to enhance cleanability while ensuring sufficient strength.

The frame base may comprise laser-cut, machined, molded or otherwise-formed components, and include legs 15, longitudinal support rails 16, lateral support rails 17, transverse support beams 18 and vertical connecting beams 19, which may be integral with one or more brackets. The base is simple and comprises minimal parts. The configuration of the base may be varied depending on the particular application and is not limited to the embodiment shown here. Components of the frame base can be suspended, cantilevered or otherwise configured.

The illustrative conveyor frame includes a pair of parallel, spaced apart toolbars 10a, 10b extending from a first end of the conveyor to the second end of the conveyor. Alternatively, a single toolbar or more than two toolbars may be used. Instead of spanning the length of the conveyor, the conveyor may include several smaller toolbars extending along a side of the conveyor. Brackets 20, 30 and 40 extend between and connect the toolbars 10a, 10b. The brackets 20, 30 and 40 include upper recesses for receiving a wearstrip, as described below. The toolbars 10a, 10b may be inserted into recesses on the brackets and retained through any suitable means.

Figure 3A:
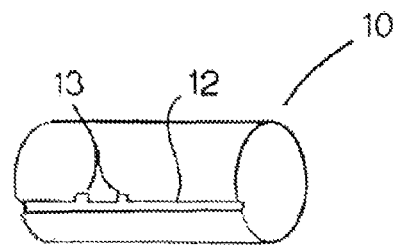
FIG. 3A is a partial isometric view of a toolbar suitable for a conveyor frame according to an embodiment of the invention.

As shown in FIG. 3A, each toolbar 10 comprises solid or hollow shaft, which may be stainless steel or another suitable material, having a round or D-shaped cross-section. The toolbar 10 includes a longitudinal channel 12 for anchoring an auxiliary component thereto. The illustrative channel 12 is continuous along the length of the toolbar shaft, though the invention is not so limited. The longitudinal channel 12 engages a protrusion of the auxiliary component, such as the barbed tip 8 of the component 1 of FIG. 1, to prevent rotation of the auxiliary component about the shaft once mounted to the shaft. The toolbar may also include axial notches 13 for engaging tabs on the auxiliary components, such as tab 9 of the component 1 of FIG. 1, to prevent sliding of an auxiliary component once mounted to the shaft.

Figure 3B:
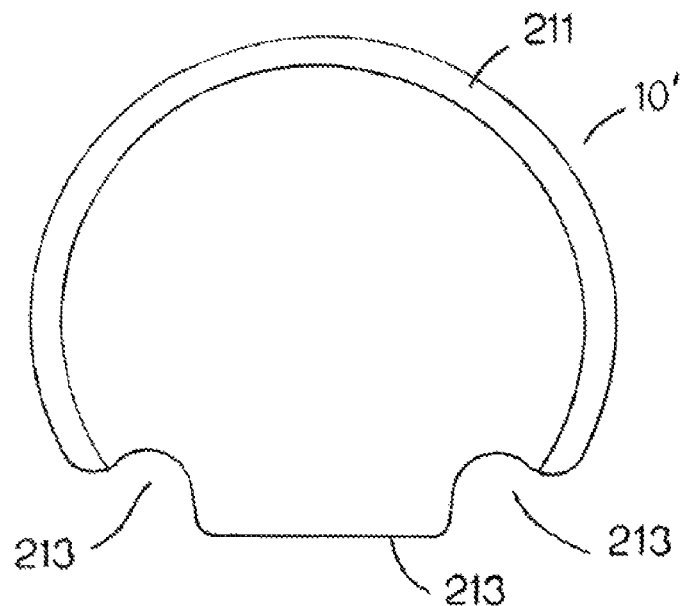
FIG. 3B is a cross-sectional view of a toolbar according to another embodiment.

The toolbar 10 may have multiple channels 12 in different locations on the perimeter of the shaft. For example, FIG. 3B is a cross-sectional view of another embodiment of a toolbar 10' suitable for engaging a snap clamp connected to a component to mount the component onto the toolbar. The toolbar 10' comprises a rounded top portion 211, a flat bottom surface 213 and channels 212 at the intersection of the rounded top portion 211 and flat bottom surface 213. The channels have a parabolic cross-section, thought the invention is not so limited.

Figure 3C:
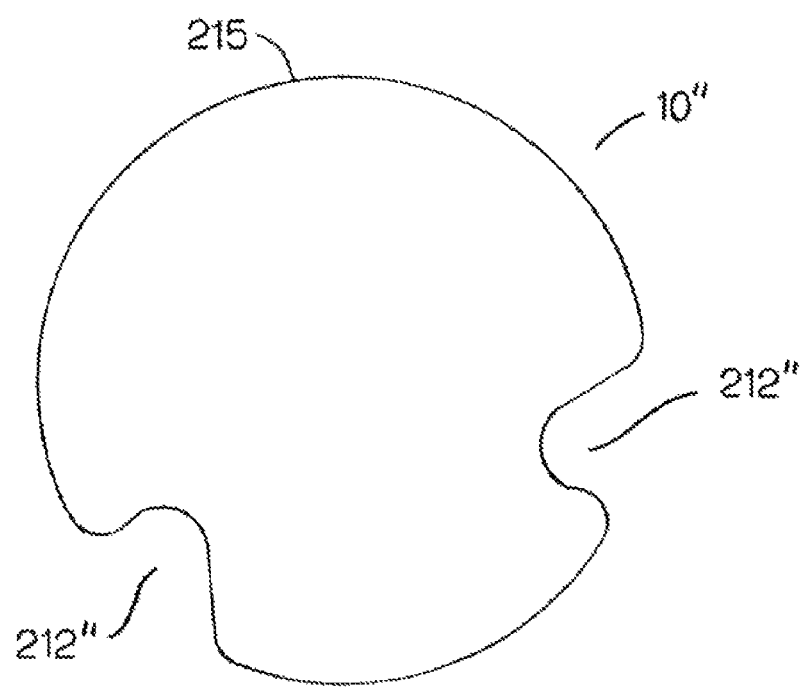
FIG. 3C is a cross-sectional view of a toolbar according to another embodiment.

FIG. 3C is a cross-sectional view of another embodiment of a toolbar 10" suitable for engaging a snap a snap clamp. The toolbar 10" is substantially round, with mirror-image channels 212". The illustrative channels 212" are formed in the lower sides of the toolbar 10", for example, between about 90 degrees and about 170 degrees from the top 215. The channels may have any suitable configuration and size suitable for engaging a protrusion on a corresponding snap clamp.

A toolbar need not extend along the entire length of the conveyor. For example, alternatively, the toolbar may comprise one or more nubs having a longitudinal channel for locking the auxiliary components. The nub may extend from or attach to a bracket or another component of the frame. Additional toolbars may be included for mounting auxiliary components in other locations on the conveyor. For example, transverse toolbars may be provided at the idle end for mounting infeed shoes and-or other components, at the drive end for mounting a sprocket, position limiter and-or other components, or at an intermediate location along the length of the conveyor.

Figure 4:
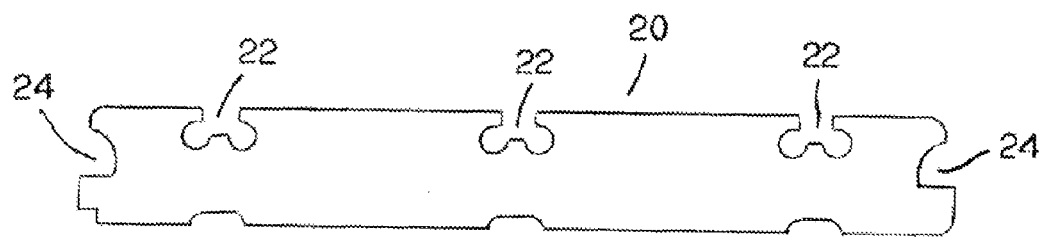
FIG. 4 is a front view of a central bracket of the frame of FIG. 2.

In the illustrative embodiment, central brackets 20 extend laterally between the two toolbars 10a, 10b in the center of the frame 2. FIG. 4 shows an embodiment of a central bracket 20. The central bracket comprises a plate having upper recesses 22 for receiving a wearstrip. The illustrative upper recesses 22 include rounded clean-out chambers, though the invention is not so limited. The upper recesses may engage a wearstrip through any suitable means, including, but not limited to, friction fit, locking engagement or other suitable coupling means. The central bracket further includes side recesses 24 for receiving a toolbar 10. The toolbar may be snap fit in the associated side recess 24, or coupled to the bracket through any suitable means.

Figure 5A:
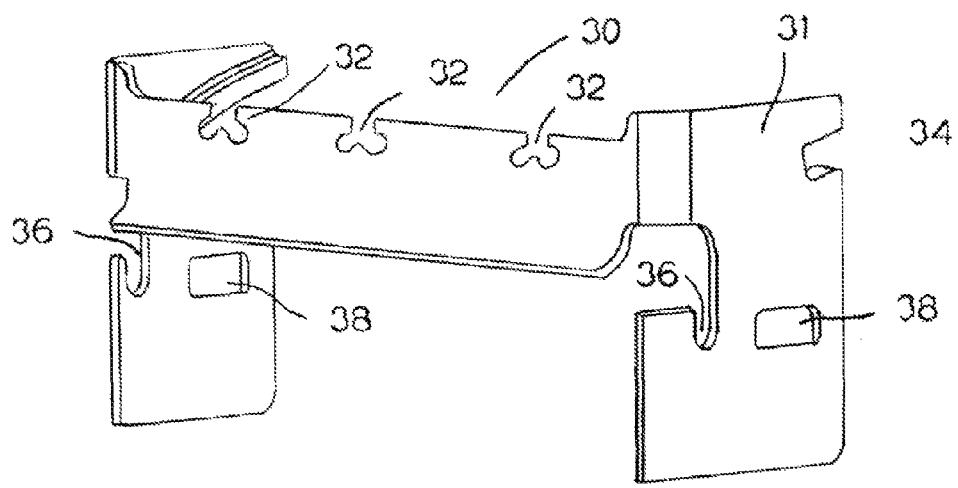
FIG. 5A is an isometric rear view of a drive end bracket of the frame of FIG. 2.
Figure 5B:
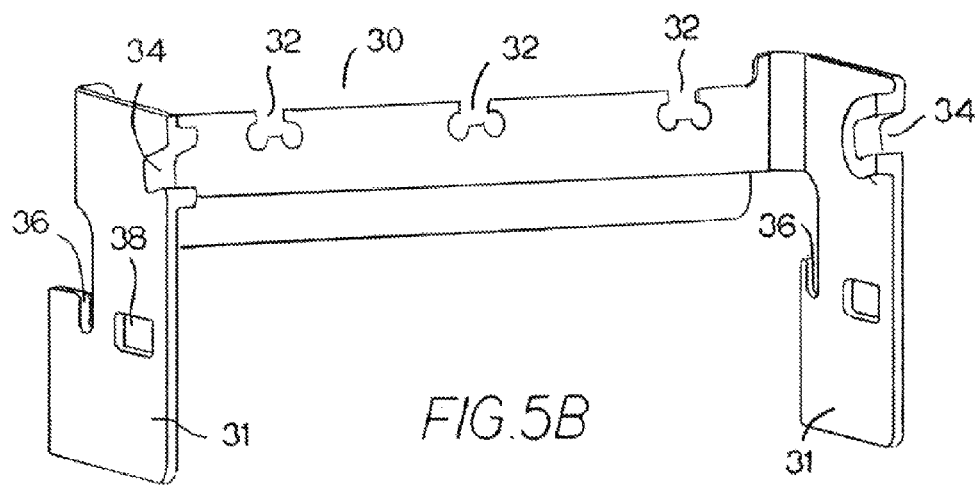
FIG. 5B is an isometric front view of the drive end bracket of FIG. 5A.

Referring to FIGS. 5A and 5B, a drive end bracket 30, disposed at the drive end of the conveyor 2 may includes upper recesses 32 for engaging a wearstrip. The drive end bracket 30 further includes side plates 31 having slots 34 for mounting a drive sprocket. The illustrative side plates 31 further include a limiter assembly slot 36 for mounting a position limiter assembly and windows 38 for locking a position limiter assembly in place, though the invention is not so limited. The toolbars 10a, 10b attach to the outer sides of the side plates 31 through any suitable means.

Figure 6B:
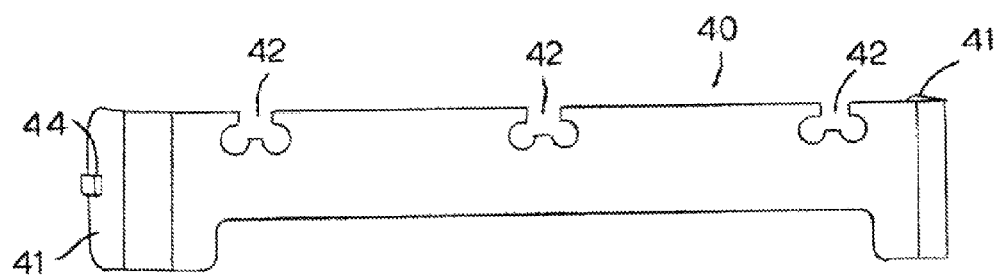
FIG. 6B is an isometric front view of the idle end bracket of FIG. 2.
Figure 6A:
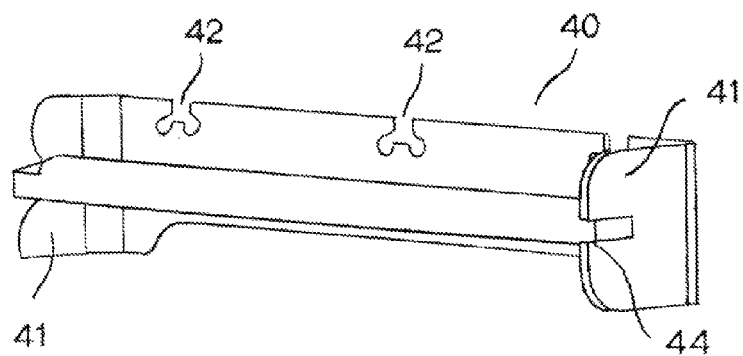
FIG. 6A is a rear view of an idle end bracket from FIG. 2.

Referring to FIGS. 6A and 6B, the idle end bracket 40, disposed at the idle end of the conveyor 2, includes upper recesses 42 and side plates 41. The side plates include slots 44 for receiving mounting tabs on an infeed shoe assembly shaft, as described below. The toolbars 10a, 10b attach to the outer sides of the side plates 31 through any suitable means.

The brackets may have any suitable shape not limited to the illustrative embodiment. The brackets may be designed to mount on a central shaft, rather than interface with side toolbars. The brackets may also have curved upper edges to trough the conveyor belt.

Various auxiliary conveyor components may be attached to and removed from the conveyor frame using a snap-fit connection. Examples of auxiliary conveyor components include, but are not limited to, sprockets, infeed shoes, outfeed shoes, wearstrips, wearstrip locks, returnway rollers, side walls, containment blocks, position limiters, side guards, scraper assemblies and any other component that performs a select function in a conveyor.

Figure 7:
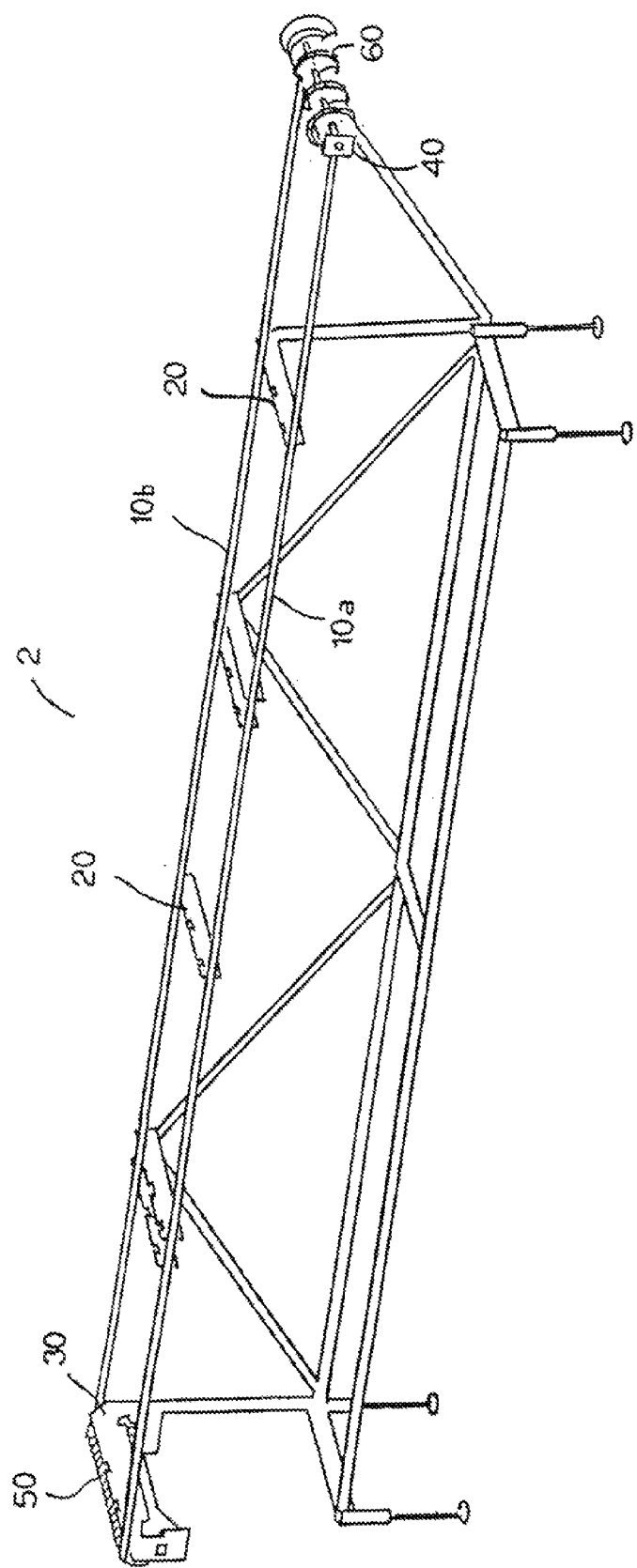
FIG. 7 shows the frame of FIG. 2 with a sprocket and infeed shoes mounted thereon.

As shown in FIG. 7, a drive sprocket 50 may be mounted to the drive end bracket 30 and an infeed shoe assembly 60 may be mounted to the idle end bracket 40. The illustrative drive sprocket assembly includes a position limiter assembly described in U.S. Provisional Patent Application No. 61/931,058, filed Jan. 24, 2014 and U.S. Provisional Patent Application No. 62/061,346, filed Oct. 8, 2014, both titled Snap-On Position Limiter for a Conveyor Belt, the contents of which are incorporated herein by reference, though the invention is not limited to a drive sprocket assembly with a position limiter.

The drive end bracket 30 may accommodate a right-angled motor, if desired.

Figure 8:
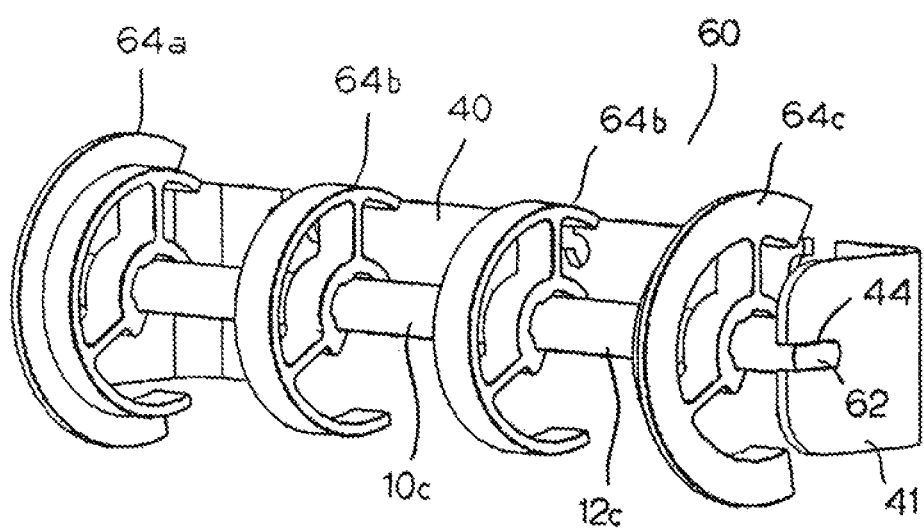
FIG. 8 shows the infeed shoe assembly of FIG. 7.

The infeed shoe assembly 60, and embodiment of which is shown in FIG. 8 mounted to an idle end bracket 40, comprises a shaft, such as a toolbar 10c, extending between the side plates 41. The illustrative toolbar 10c includes tabs 62 configured to fit in the slots 44 on the side plates 41. The toolbar 10c includes a channel 12c formed on a bottom surface. Infeed shoes 64a, 64b, 64c for guiding a conveyor belt are mounted and retained on the toolbar 10c through a snap-fit connection, as described below. The illustrative infeed shoe assembly 60 includes two edge infeed shoes 64a, 64c and two inner infeed shoes 64b. Other suitable means for guiding the conveyor belt may alternatively be used.

Figure 9:
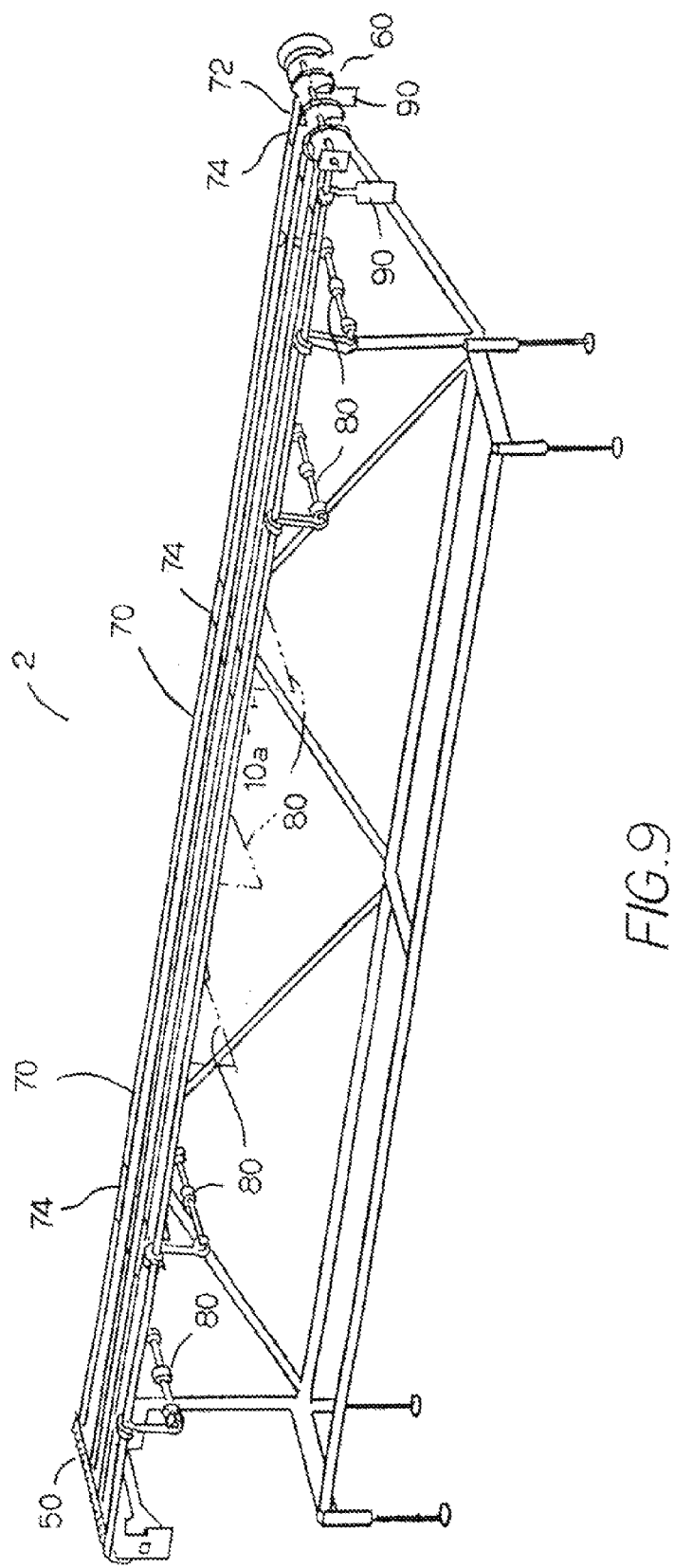
FIG. 9 shows the frame of FIG. 7 further including returnway rollers, wearstrips, and containment blocks mounted thereon.

As shown in FIG. 9, wearstrips 70 forming a support surface for a conveyor belt may be mounted in the upper recesses 22, 32, 42 of the brackets 20, 30, 40. The wearstrips include wearstrip locks 72, 74 for securing the wearstrips 70 to the brackets, though other suitable attachment means may be used. In place of brackets, the wearstrips may alternatively be mounted through other suitable means. For example, the wearstrip end may employ a snap clamp configured to mount onto a transverse toolbar, or the wearstrip may be inserted in another mounting structure. The wearstrips can comprise several mating pieces.

Returnway roller assemblies 80 may be mounted to the toolbars 10a, 10b at intermittent locations along the length of the conveyor for supporting a conveyor belt in the returnway. Containment blocks 90 may also be mounted to the toolbars at one or more locations, illustrated as close to the idle end of the conveyor.

Figure 10:
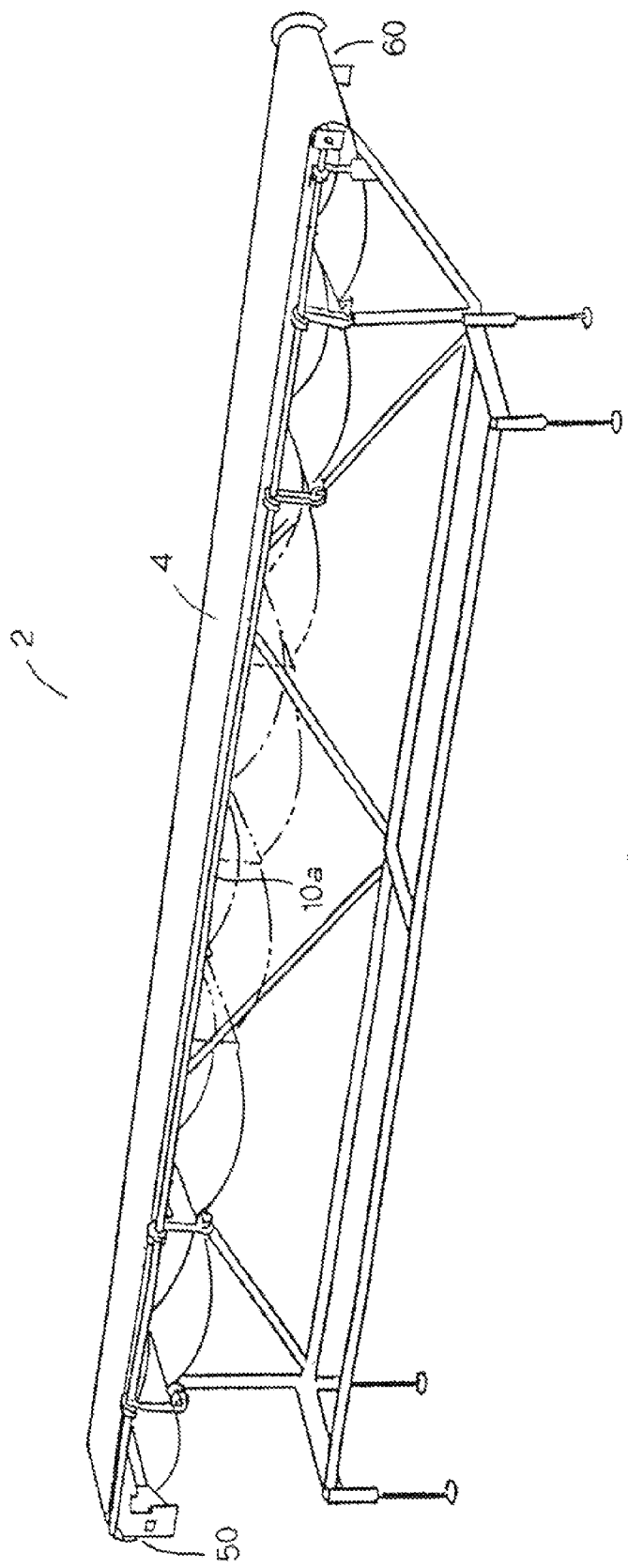
FIG. 10 shows the frame of FIG. 9 further including an endless conveyor belt.

As shown in FIG. 10, the exemplary conveyor frame may support an endless conveyor belt 4 traveling between a first end of the frame and a second end of the frame to convey products from the first end to the second end along a carryway. The endless conveyor belt 4 is trained around the drive sprocket 50 and infeed shoes 64a, 64b, 64b to form a carryway over the wearstrips 70 and a returnway below. The returnway rollers in the returnway roller assemblies 80 support the sag in the returnway. The illustrative conveyor belt 4 is a Thermodrive® conveyor belt available from Intralox, LLC of Harahan, La., though any suitable conveyor belt may be supported by the conveyor frame 2.

The exemplary conveyor frame supports a conveyor belt traveling between a first end of the frame and a second end of the frame. The conveyor belt conveys products from the first end to the second end along a carryway. The conveyor belt 4 may be trained around reversing elements at each end of the carryway and returned along a returnway below the carryway.

Figure 11A:
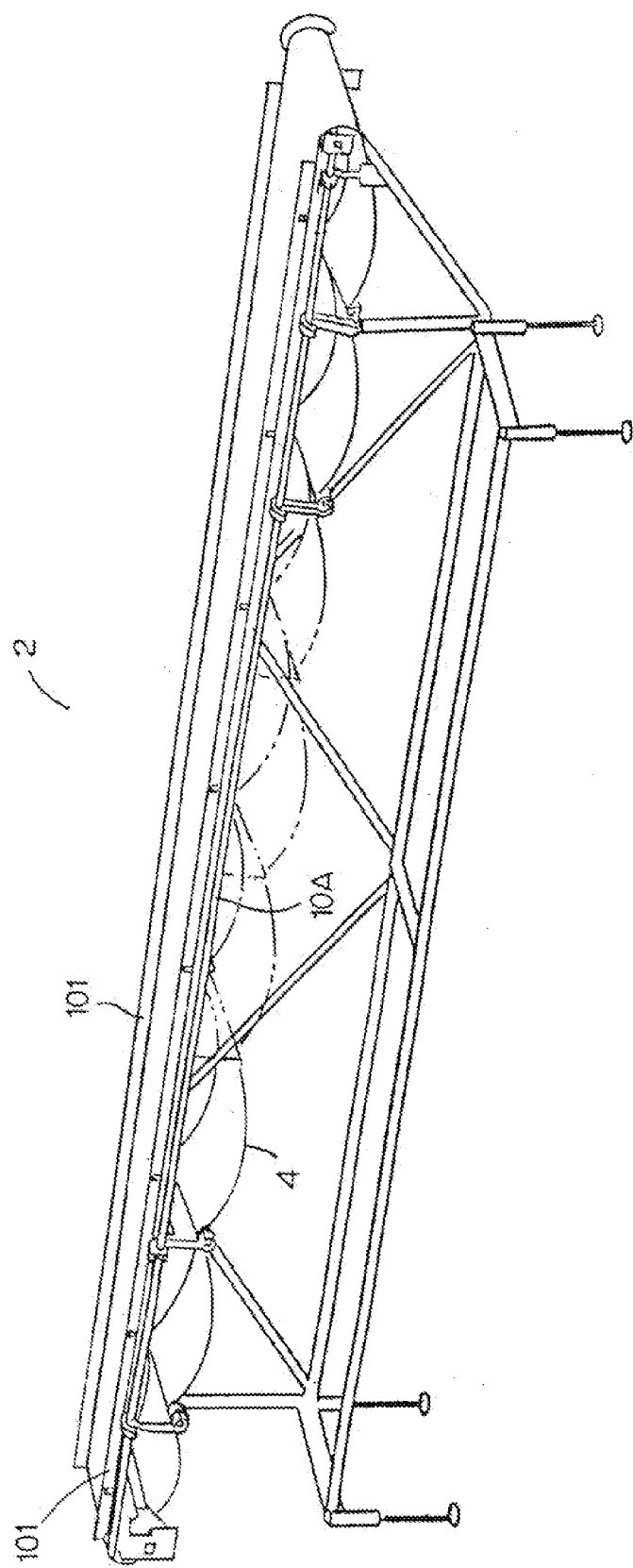
FIG. 11A shows the frame of FIG. 10 further including mounted side walls.
Figure 11B:
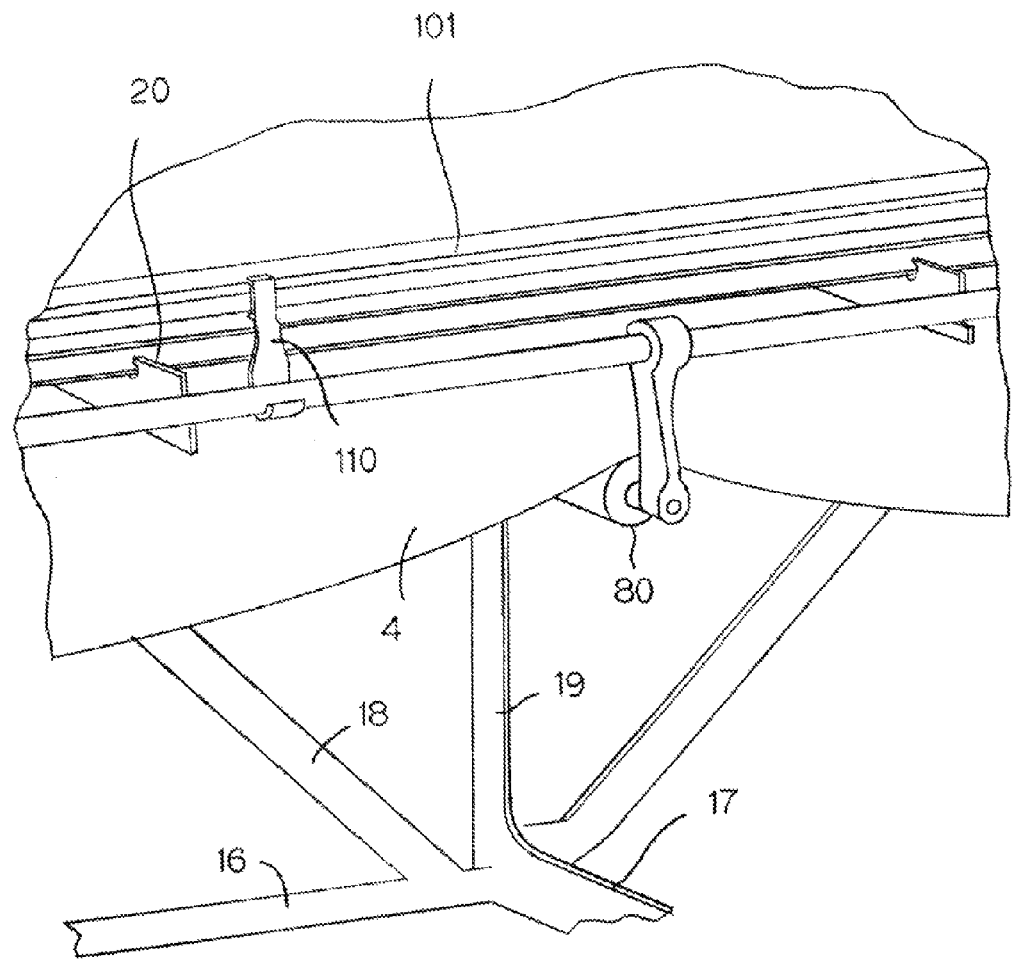
FIG. 11B is a detailed view of a central portion of the frame of FIG. 11A.

Referring to FIGS. 11A and 11B (detailed view), additional auxiliary components, such as sidewalls, may be incorporated. In the illustrative embodiment, the side walls 101 are held in place using vertical connectors 110 mounted to the toolbars 10*a* and 10*b*.

Figure 12:
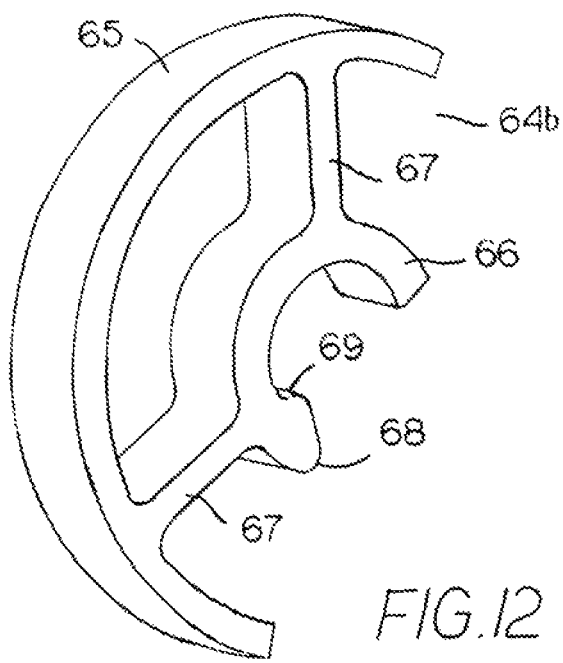
FIG. 12 shows an embodiment of an infeed shoe suitable for mounting to a toolbar in a conveyor frame according to one embodiment of the invention.

FIG. 12 illustrates an embodiment of an inner infeed shoe 64*b* mountable to a toolbar shaft in an infeed shoe assembly 60 at the idle end of the conveyor 2. The inner infeed shoe has a functional portion comprising an outer perimeter 65 for contacting the conveyer belt. The outer perimeter 65 is in the shape of an arc extending through about 180°. A central hub 66 forms a snap clamp for attaching the infeed shoe 64*b* to a shaft. Spokes 67 connect the central hub to the outer perimeter 65. The central hub forms a substantially semi-circular gripping element terminating at one end in a barbed engagement tip 68. The barbed tip forms a protrusion 69 for engaging the channel 12*c* on the toolbar 10*c*. To mount the inner infeed shoe 64*b* on the toolbar 10*c*, the central hub 66 is placed straddling the toolbar 10*c* and pushed into engagement with the toolbar 10*c* such that the protrusion 69 engages the channel 12*c* and the inner surface of the hub 66 wraps around and abuts the toolbar outer surface. The central hub 66 may flex slightly to accommodate the toolbar 10*c*. The inner surface of the hub 66 may include cleaning recesses (not shown). The engagement between the protrusion 69 and channel 12*c* prevents radial movement of the infeed shoe relative to the toolbar 12*c*.

Figure 13:
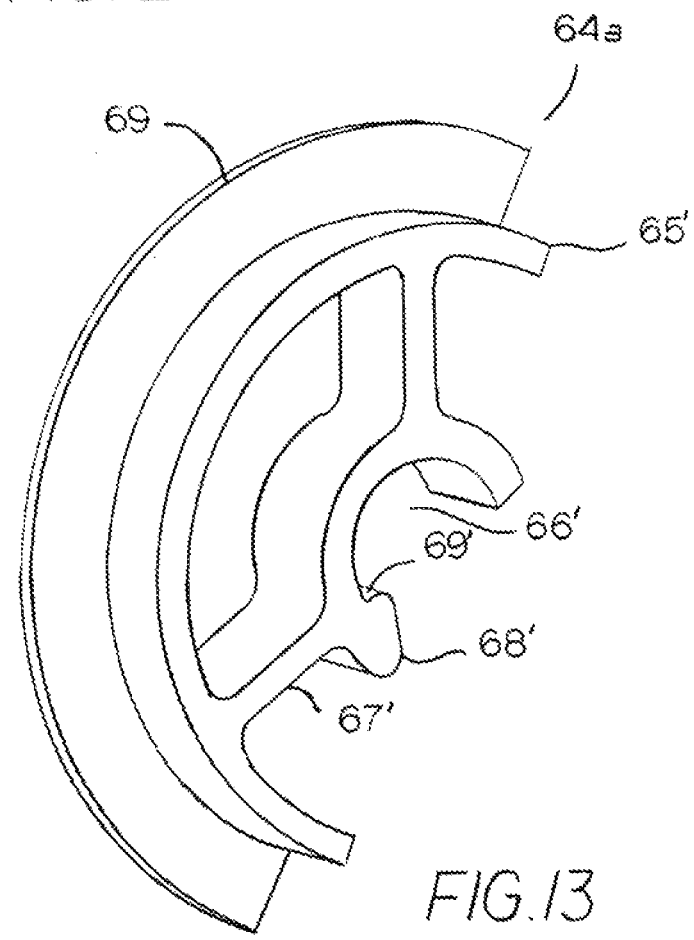
FIG. 13 shows an embodiment of an edge infeed shoe suitable for mounting to a toolbar in a conveyor frame according to one embodiment of the invention.

As shown in FIG. 13, an outer infeed shoe 64*a* further includes a peripheral edge 69 in the functional portion. The peripheral edge 69 extends perpendicular to the outer perimeter 65' for guiding the edge of a conveyor belt.

FIGS. 14A and 14B show another embodiment of an inner infeed shoe 160. The inner infeed shoe comprises a solid collar 166 forming a snap clamp. The collar forms first and second legs 162, 163. A protrusion 168 extends inwards from the first leg 162. An axial tab 164 extends between the inner surface of the collar and the protrusion 168 for engaging an axial recess on the associated toolbar to which the shoe 160 is mounted.

FIGS. 15A and 15B show another embodiment of an edge infeed shoe 162, including a peripheral edge 169 extending perpendicular to the outer surface of the snap clamp collar 166'.

The infeed shoes shown in FIGS. 11-15B may be molded plastic components.

FIG. 16 illustrates an embodiment of a returnway roller assembly 80 mountable to the toolbars 10*a*, 10*b*. The returnway roller assembly 80 includes a series of rollers 81 connected by axles 82 and having end tabs 83. Connectors 84 receive the end tabs at a first end 85. The first end 85 may be a j-hook, snap clamp or other suitable receiver. A second end of the connector 84 forms a snap clamp 86 for locking the connector to a toolbar 10. The snap clamp 86 includes a protrusion 87 that is insertable in a channel 12 of a toolbar 10. The axis of the lower connector 85 is perpendicular to the axis of the upper snap clamp 86. A body 88 connects the upper and lower connectors 86, 85. The illustrative body 88 includes perpendicular ribs, but the body 88 may have any suitable configuration, such as a torsioned configuration, to accommodate the perpendicular connectors. The body 88 may also form or connect to a block for containing the edge of the conveyor belt in the returnway. The illustrative connector 84 may be a molded plastic component.

The upper snap clamps 86 are each mounted to a toolbar 10*a*, 10*b* by placing the clamp over the toolbar and pushing the clamp into place around the toolbar shaft, such that the protrusion engages a channel 12 on the toolbar.

While the illustrative rollers 81 are solid, the rollers may alternatively be spoked wheels, hollow rollers or another suitable structure.

FIG. 17 shows an embodiment of a containment block 90 that may be mounted to a toolbar 10*a* or 10*b*. The toolbar 90 includes an upper snap clamp 91 including a tapered tip 93 having a protrusion 92 for insertion in a channel 12 on a toolbar 10, and a functional portion, comprising a lower block 95 for guiding a conveyor belt edge and a connecting body 96. The containment block 90 may be a molded plastic component.

FIG. 18 shows another embodiment of a containment block 190 including an upper snap clamp 191 having a protrusion 192 and tapered tip 193, a lower block 195, a lower connector 197, which may be a j-hook, snap clamp or other suitable connector, and a middle connecting body 198 between the lower block 195 and upper snap clamp 191.

Figure 19:
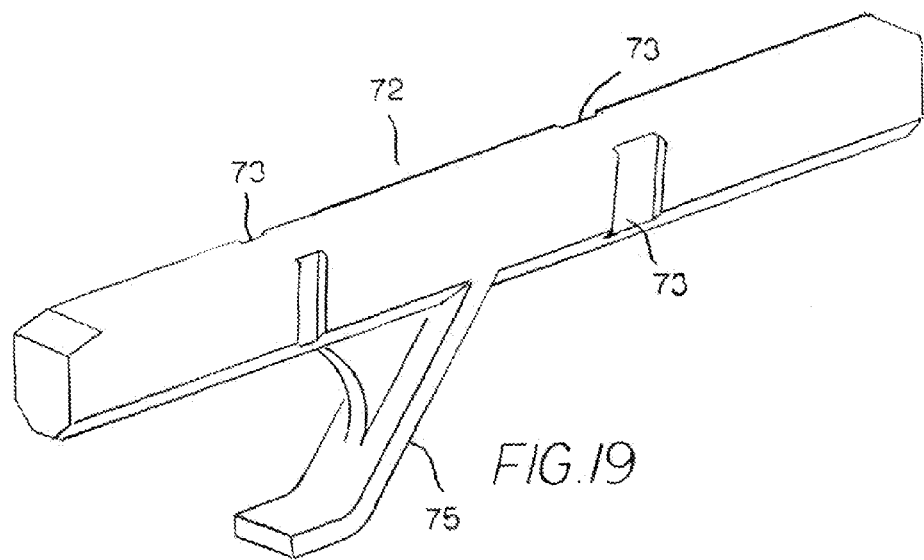
FIG. 19 shows an embodiment of a wearstrip lock suitable for use in a conveyor frame according to one embodiment of the invention.

FIG. 19 shows an embodiment of a wearstrip lock 72. The illustrative molded plastic wearstrip lock 72 is received in upper recesses in end bracket 40 and a first middle bracket 20*a*. The wearstrip lock 72 includes recesses 73 in side surface for engaging the upper recesses of the brackets. A lower leg 75 extends at an angle to the main wearstrip lock body and includes a flat lower tip parallel to the main wearstrip lock body for engaging a bottom recess on a bracket to secure the wearstrip lock 72 to the bracket.

Figure 20:
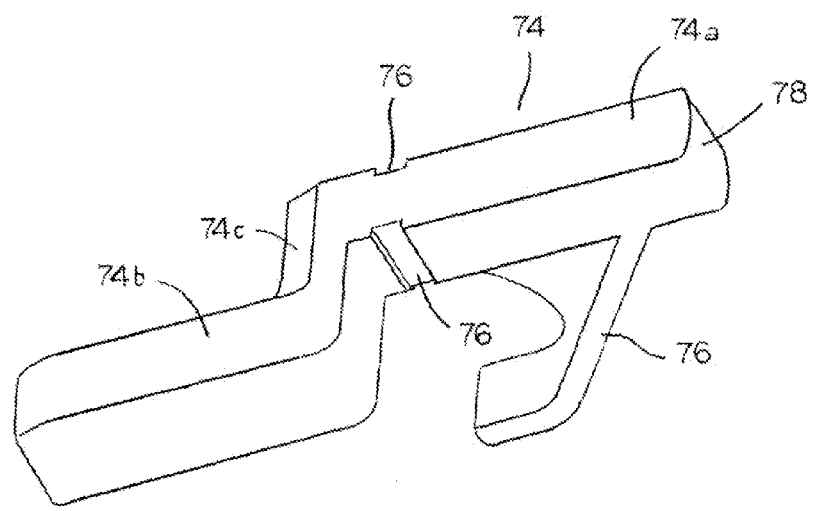
FIG. 20 shows another wearstrip lock suitable for use in a conveyor frame.

FIG. 20 shows another embodiment of a molded plastic wearstrip lock 74 that interfaces with the first wearstrip lock 72. The second wearstrip lock 74 has a main body with offset, parallel body portions 74*a*, 74*b* with a parallel connecting portion 74*c*. Side recesses 76 in the first body portion secure the wearstrip lock within an upper recess of a bracket. A lower leg 76 engages a lower recess on a bracket to secure the wearstrip lock 74 in place. The front end 78 of the wearstrip lock 74 engages a wearstrip 70, as shown in FIGS. 21A and 21B, and the rear planar portion 74*b* overlaps and faces the body of the first wearstrip lock 72.

According to one embodiment, the drive sprocket may be a lock-in-place split sprocket mounted to a toolbar shaft forming a drive axle. An embodiment of a lock-in-place split sprocket 150 is shown in FIG. 22A-22C. The lock-in-place place split sprocket 150 comprises two sprocket halves 150*a*, 150*b* that mate to form a sprocket having peripheral teeth 151. The inner hub forms a snap clamp 152 having a protrusion 153 configured to mate with a channel on a toolbar shaft connected to a sprocket frame, such as the sprocket bracket 30. An axial tab 154 is received in an axial recess in the toolbar shaft. Once mounted on the toolbar shaft, the sprockets halves are prevented from unmating.

Figure 23A:
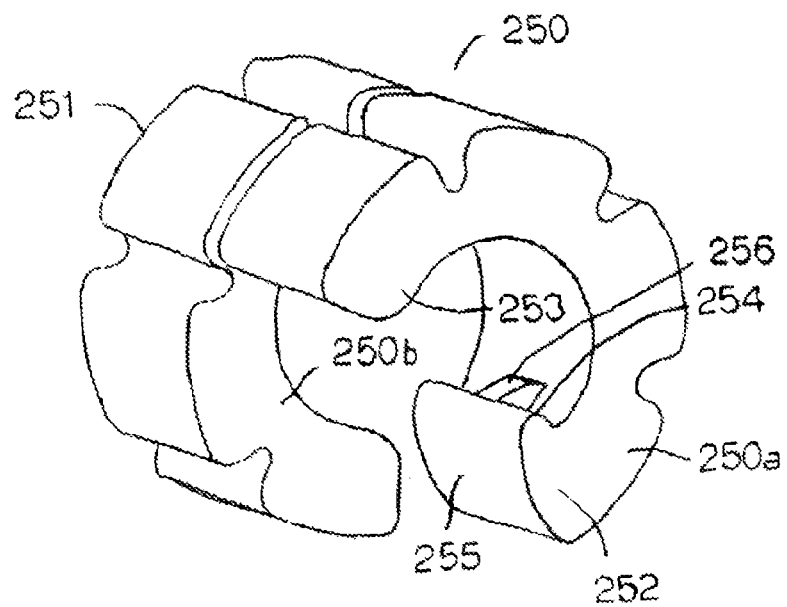
FIGS. 23A and 23B show another embodiment of a lock-in-place sprocket.
Figure 23B:
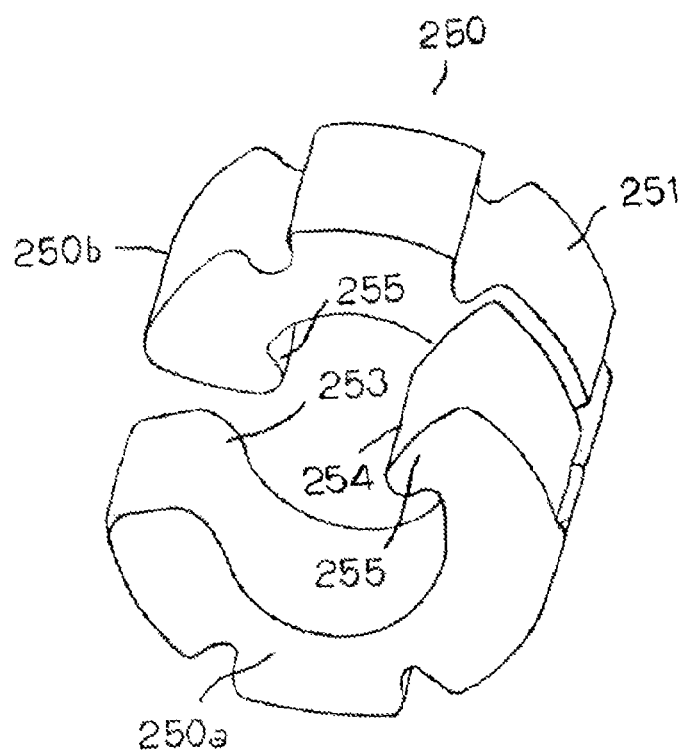

FIGS. 23A and 23B show another embodiment of a lock-in-place split sprocket 250 comprising two sprocket halves 250*a*, 250*b* that are mountable to a toolbar forming an axle. Each sprocket half 250*a*, 250*b* includes peripheral teeth 251. The body of each sprocket half arcs through at least 180°, forming a pair of legs 252, 253. The first leg includes a tapered tip 254 including a protrusion 255. An axial tab 256 extends from an inner surface of the body and the protrusion 255. Each sprocket half 250*a*, 250*b* engages a separate channel on a toolbar, with each axial tab 256 engaging an axial recess on the toolbar. When locked side-by-side onto the toolbar, the sprocket halves 250*a*, 250*b* form teeth about the perimeter of the sprocket 250. Some of the teeth 251 may align.

FIGS. 24A and 24B show an embodiment of a side wall assembly 102 that may be mounted to one of the toolbars 10*a*, 10*b* to constrain the conveyor belt, as shown in FIGS. 11A and 11B. Each side wall 101 is a molded plastic component having a flat inner surface and an outer surface with a ridge 103. Each vertical connector 110, which may also comprise a molded plastic component, has an upper connector 111 for receiving the ridge 103, a connecting body 112 and a lower snap clamp 113 for mounting the connector 110 to a toolbar 10*a* or 10*b*. The lower snap clamp 113 includes an arced body forming a tapered tip 114 having a protrusion 115 for locking the snap clamp 113 into a channel 12 on the toolbar 10*a* or 10*b*.

Figure 25:
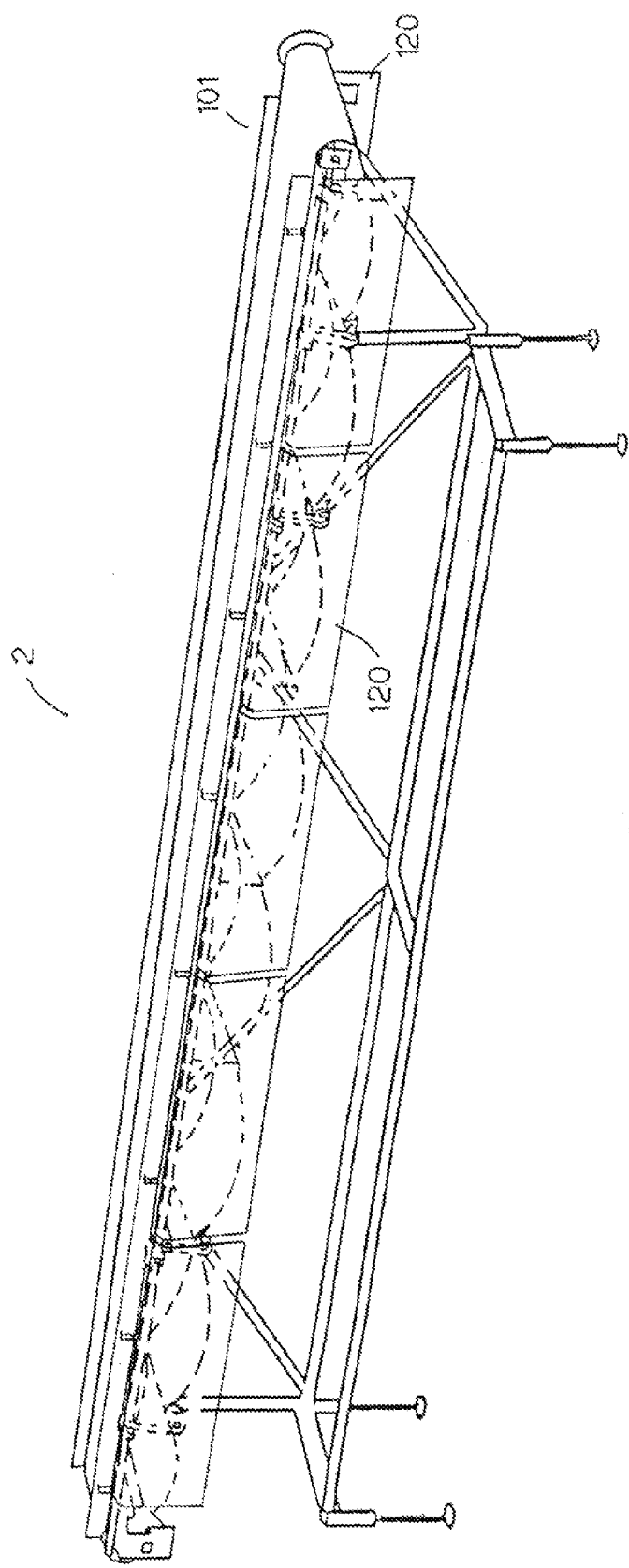
FIG. 25 shows a conveyor including a lower side guard assembly mounted to a toolbar according to an embodiment of the invention.
Figure 26A:
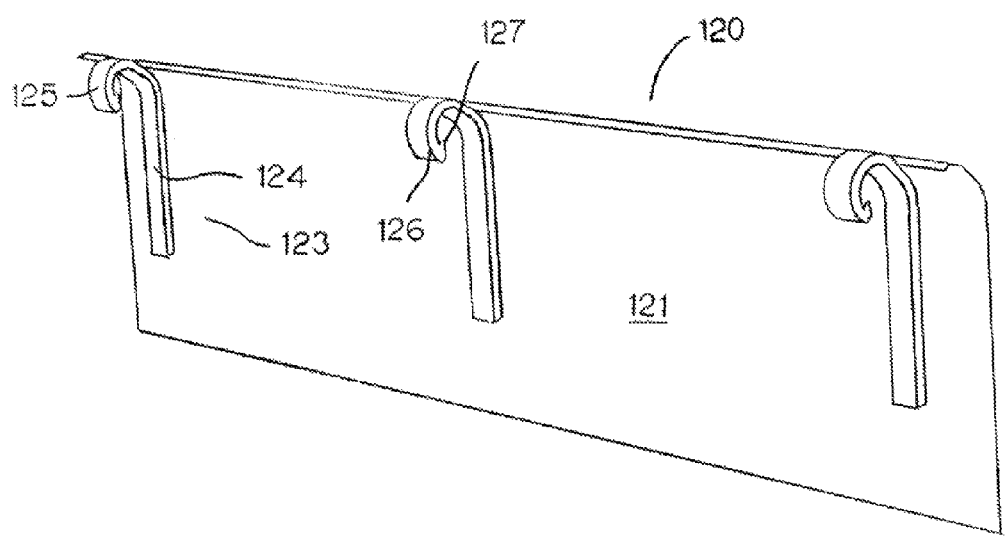
FIGS. 26A and 26B show the lower side guard assemblies of FIG. 25.
Figure 26B:
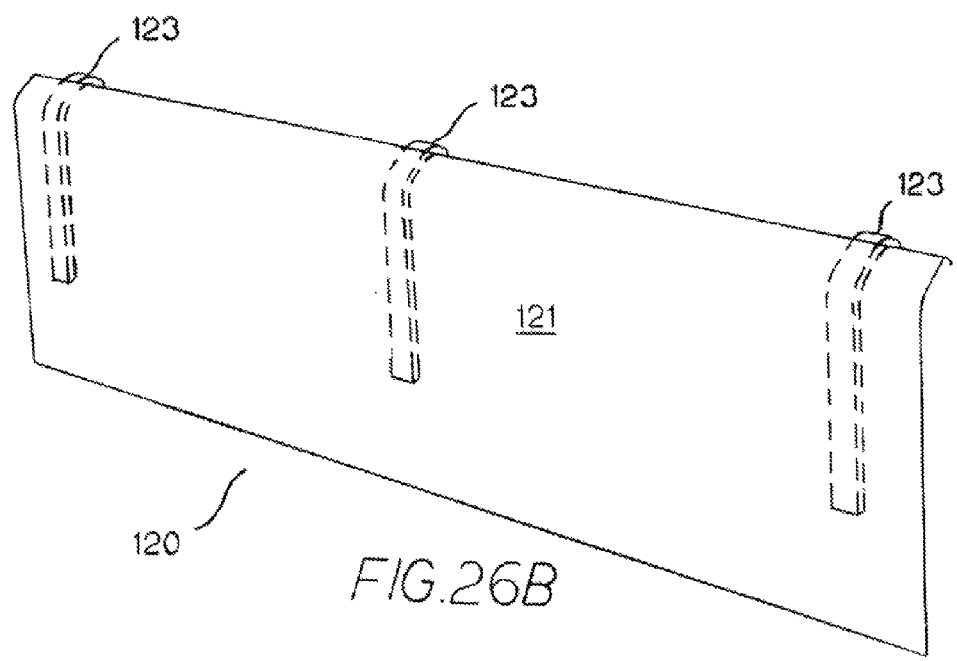

As shown in FIG. 25, the toolbars 10*a* and-or 10*b* may be used to attach one or more lower side guard assemblies 120 to the conveyor 2. FIGS. 26A and 26B show the lower side guard assembles 120. Each lower side guard assembly 120 includes a wall 121, which may be molded plastic, having an upper portion that curved inwards and connectors 123 including a body 124 attached to the wall 121 and an upper snap clamp 125 that curves with the wall, and further curves inwards, terminating in a tapered tip 126. The tapered tip 126 includes a protrusion 127 configured to be received in the channel 12 of a toolbar. The lower side guard assembly 120 may be mounted to the toolbar by snapping the snap clamp around the toolbar such that the protrusion 127 engages the channel. Optionally, axial tabs on the snap clamp 125 may engage axial recesses in the toolbar to prevent sliding of the lower side guard assembly 120 along the toolbar after being mounted in place. The connectors 123 are positioned along the wall 121 so that when mounted, the connectors are spaced from other auxiliary components, such as returnway roller assemblies 80 and-or side wall assemblies 101 also mounted to the toolbar.

Figure 27:
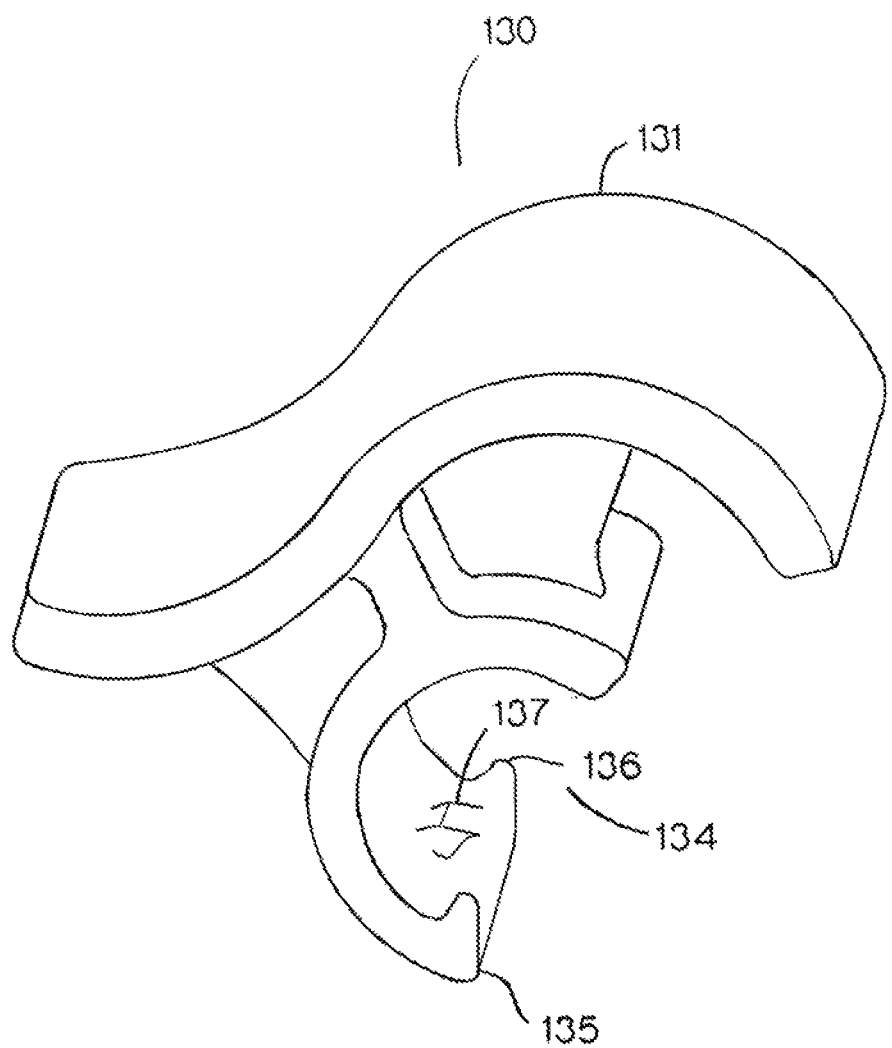
FIG. 27 shows a position limiter suitable for mounting to a toolbar in conveyor frame according to an embodiment of the invention.

FIG. 27 shows an embodiment of a snap-on position limiter 130 including a snap clamp for mounting the position limiter to a toolbar located below the sprocket. The position limiter ensures proper engagement between the sprocket and conveyor belt. The position limiter includes a functional portion, including an upper limiting surface 131 having a concave portion and a convex portion, a body and a snap clamp 134 having a curved collar for engaging the toolbar, a barbed tip 135 forming a protrusion 136 for engaging a channel on the toolbar. The illustrative snap clamp 134 also includes an axial tab 137 for engaging an axial notch on the toolbar.

Figure 28A:
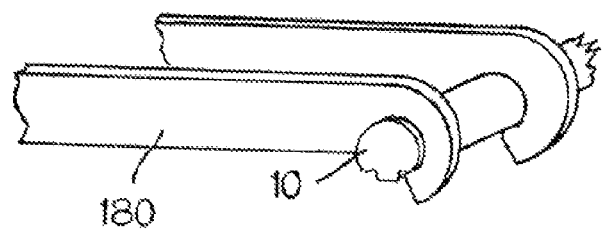
FIGS. 28A and 28B show a portion of a conveyor frame including wearstrips mounted to a toolbar according to another embodiment of the invention.
Figure 28B:
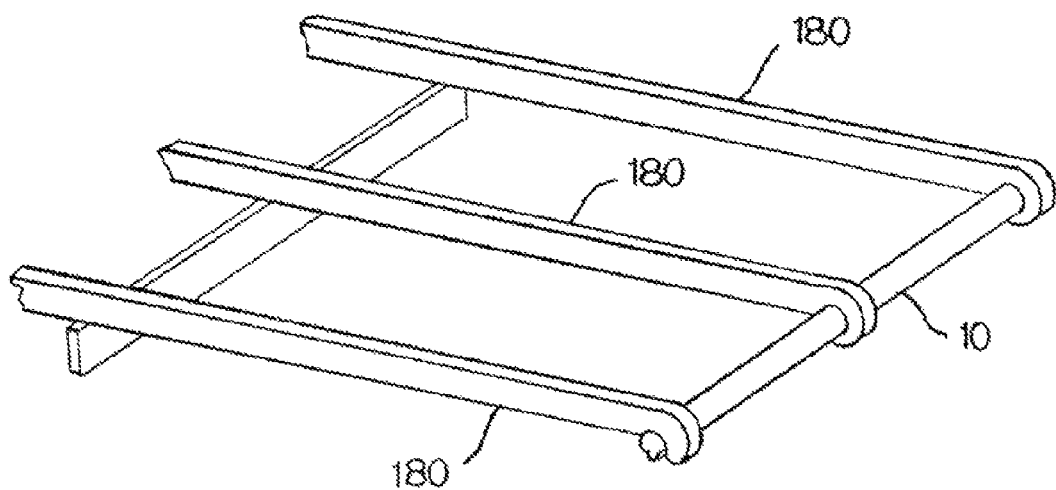

FIGS. 28A and 28B show a portion of a conveyor frame including wearstrips 180 mounted to a toolbar 10 using a snap-fit connection. Each wearstrip includes a curved end forming a snap clamp having a tab for engaging a channel on the toolbar and, optionally, a protrusion for engaging an axial recess on the channel to maintain both axial and radial position of the wearstrip 180 relative to the toolbar.

Figure 29A:
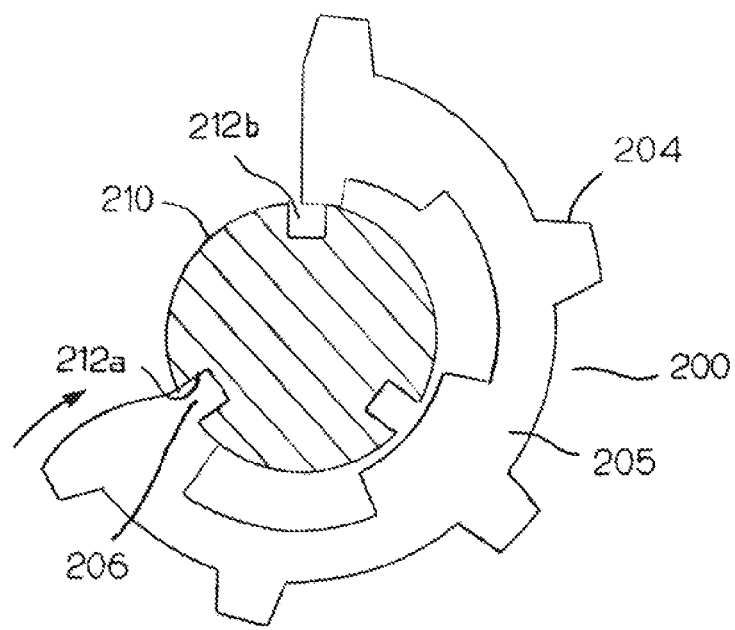
FIG. 29A illustrates a conveyor frame component mounting to a toolbar in a conveyor frame.
Figure 29B:
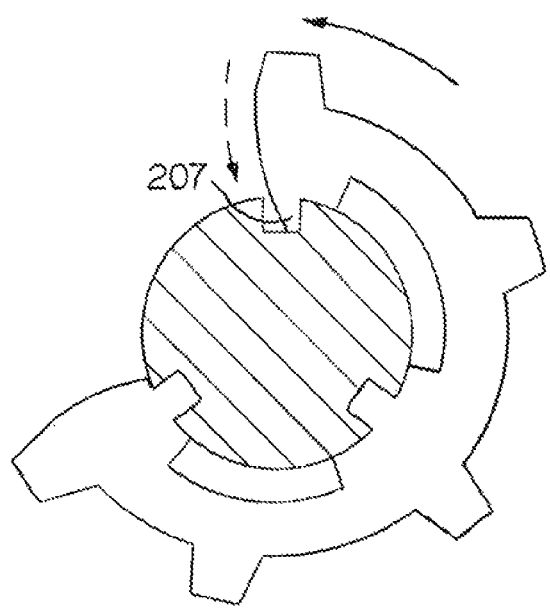
FIG. 29B shows the component of FIG. 28A mounted onto the toolbar.

FIGS. 29A and 29B show an embodiment of a snap-on conveyor sprocket 200 according to another embodiment of the invention. FIG. 29A show the sprocket 200 in a relaxed state during mounting of the sprocket 200 to a toolbar 210. The sprocket 200 includes a collar 205 having peripheral teeth 204 for driving a conveyor belt. The collar 205 also includes a first end tab 206 that is inserted into a channel 212*a* of the toolbar 210 to anchor the sprocket. The collar is sized and configured to stretch over the toolbar to lock into place. When stretched, another channel 212*b* on the toolbar receives another end tab 207, locking the sprocket 200 in place on the toolbar 210.

Figure 30A:
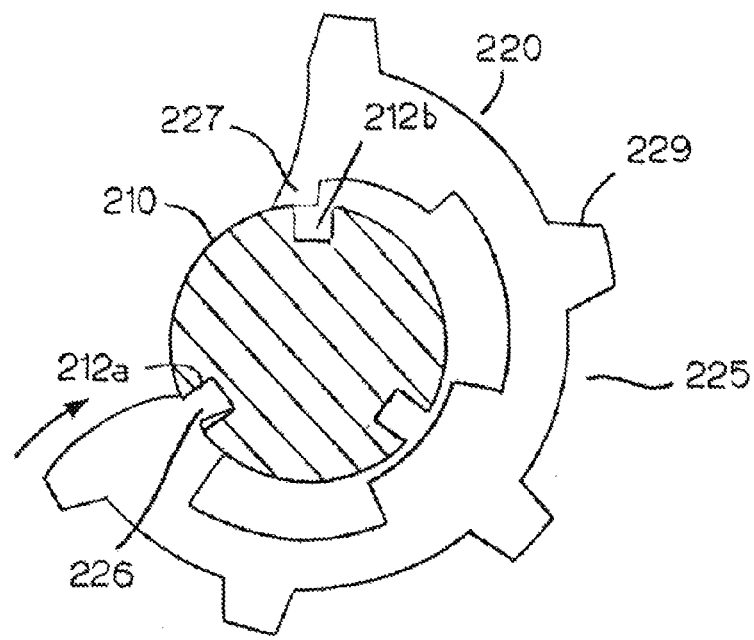
FIG. 30A shows another embodiment of a conveyor frame component mounted to a toolbar.
Figure 30B:
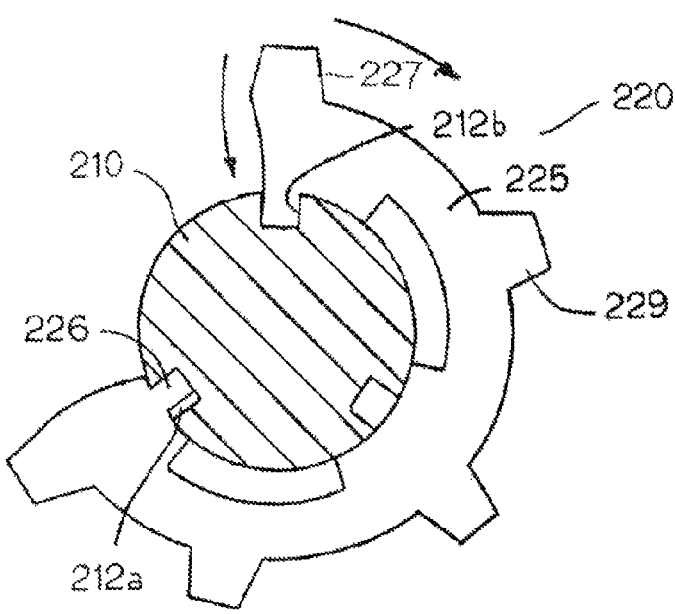
FIG. 30B shows the conveyor frame component of FIG. 30A mounted onto the toolbar.

As shown in FIGS. 30A and 30B, according to another embodiment, a snap clamp for a sprocket or other auxiliary component may be compressed to lock the component to a toolbar. For example, as shown in FIG. 30A, a resting state, a sprocket 220 has a first end tab 226 inserted in a channel 212*a* of a toolbar 210 and a second end tab 227 that extends past a second channel 212*b* of the toolbar 210. After anchoring the first end tab 226 in the channel 212*a*, the collar 225 is compressed, as shown in FIG. 30B, to seat the second end tab 227 in the second channel 212*b*, securing the sprocket 220 to the toolbar. While the illustrative functional component includes peripheral teeth 229, the auxiliary component may have any configuration for performing a desired function.

Figure 31:
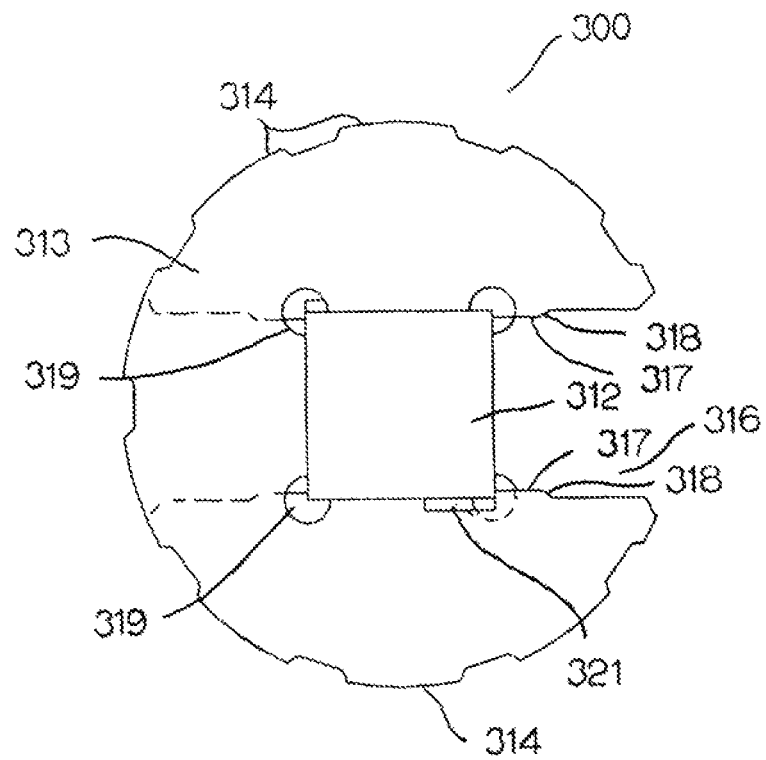
FIG. 31 shows a sprocket mounted to a conveyor frame shaft according to another embodiment of the invention.

FIG. 31 shows another embodiment of a snap-on sprocket 300 including a snap clamp for attaching the sprocket or another associated auxiliary component to a shaft 312. The sprocket includes a disc-shaped body 313 with peripheral teeth 314. The body includes an opening 316 for receiving the shaft. The opening 316 includes protrusions 317 having sloped faces 318 for allowing insertion of the shaft into a sprocket seat while preventing the shaft from exiting the sprocket seat. Corners of the sprocket seat may include cut outs 319 to provide flex relief that allow flexing of the opening with less stress on the sprocket material. In one embodiment, the sprocket seat includes a tool cut out 321 out to allow insertion of a tool for assisted removal of the sprocket from the shaft. The shaped opening 316 allows for a snap-on interference fit between the sprocket and shaft that is relatively easy to assemble, yet more difficult to disassemble.

Figure 32:
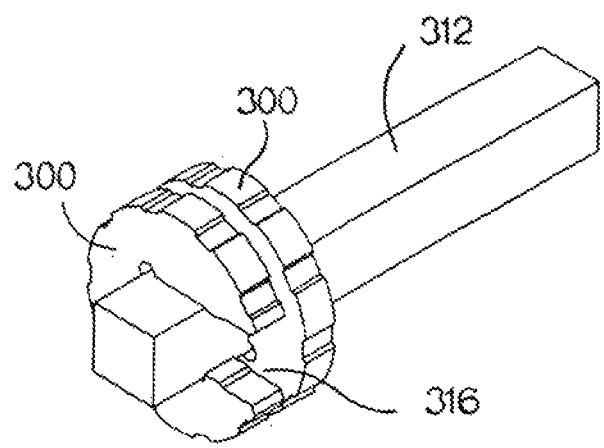
FIG. 32 shows a pair of offset sprockets mounted to a conveyor shaft.

As shown in FIG. 32, multiple sprockets 300 may be mounted adjacent to and offset radially from each other to provide a full perimeter of teeth for driving a belt. The illustrative sprockets are offset 180° so that the openings 316 are opposite each other, though the invention is not so limited.

Figure 33A:
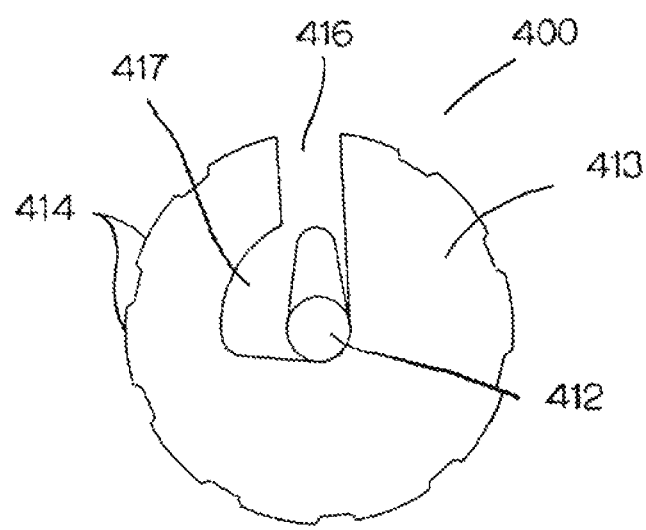
FIGS. 33A-33C show another embodiment of a mountable conveyor sprocket and conveyor frame shaft.
Figure 33B:
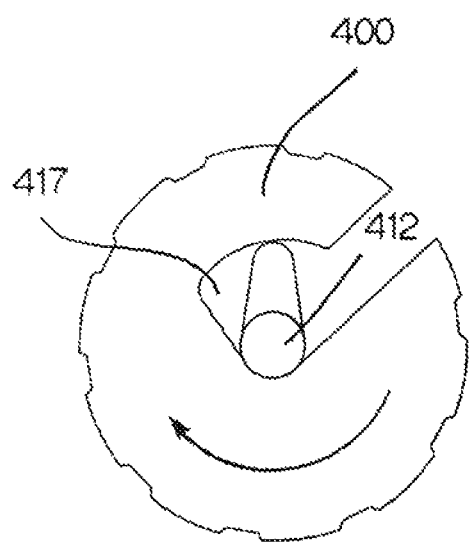
Figure 33C:
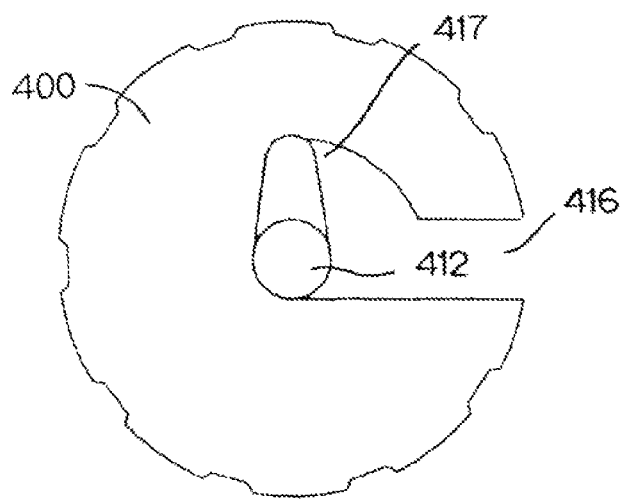
Figure 34:
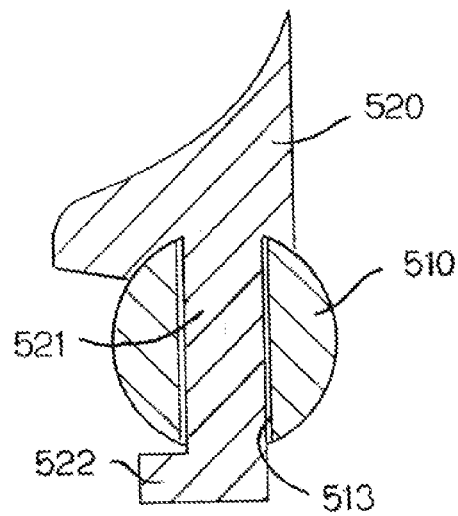
FIG. 34 shows another embodiment of a conveyor component mounted to a shaft through an opening in the shaft.

FIGS. 33A-33C show another embodiment of a snap-on sprocket 400. The snap-on sprocket 400 includes a disc-shaped body 413 with peripheral teeth 414. The body 413 includes an opening 416 terminating in a shaft seat for receiving a shaft 412 having a cam protrusion extending therefrom. The opening 416 expands to form a wedge-shaped recess 417. After the shaft 412 passes through the opening 416 to the shaft seat, as shown in FIG. 33A the sprocket is rotated, as shown in FIG. 33B to lock the sprocket onto the shaft. The cam on the shaft engages the wall of the wedge-shaped recess 417 to lock the sprocket 400 to the shaft 412, as shown in FIG. 33C. The cam and recess may have any suitable size, shape and configuration allowing for an interference fit. In another embodiment, an auxiliary component for a conveyor may be mounted to a conveyor frame component, such as a shaft, by clamping the auxiliary component through a through-hole in the shaft. As shown in FIG. 34, a toolbar shaft 510 may include a through-hole 513. The auxiliary component, shown as a position limiter 520, includes a stem 521 configured to fit through the through-hole 513. The stem 521 includes a foot 522 or other feature that engages the underside of the shaft to lock the auxiliary component onto the shaft 510.

Figure 35:
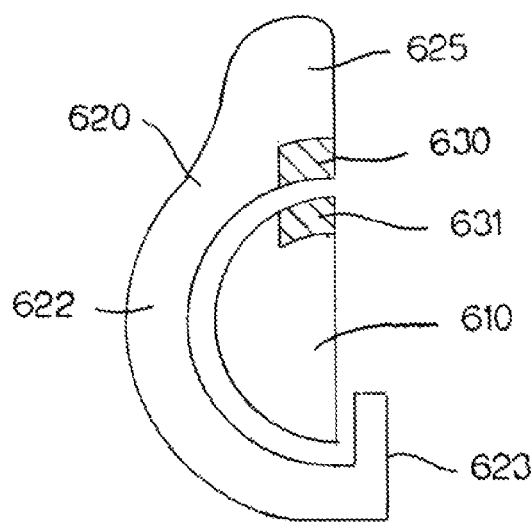
FIG. 35 shows another embodiment of a conveyor component mounted to a shaft using magnets.

FIG. 35 shows another approach to mounting a conveyor auxiliary component to a shaft using magnets to create a snap clamp. The illustrative conveyor auxiliary component 620 includes a position limiter portion 625 that acts as a position limiter, clamp portion 622 that surrounds the shaft 610, a foot portion 623 and a magnet 630. The shaft 610 includes a magnet 631 to the magnet 630 for holding the component 620 in place relative to the shaft 610.

Figure 36:
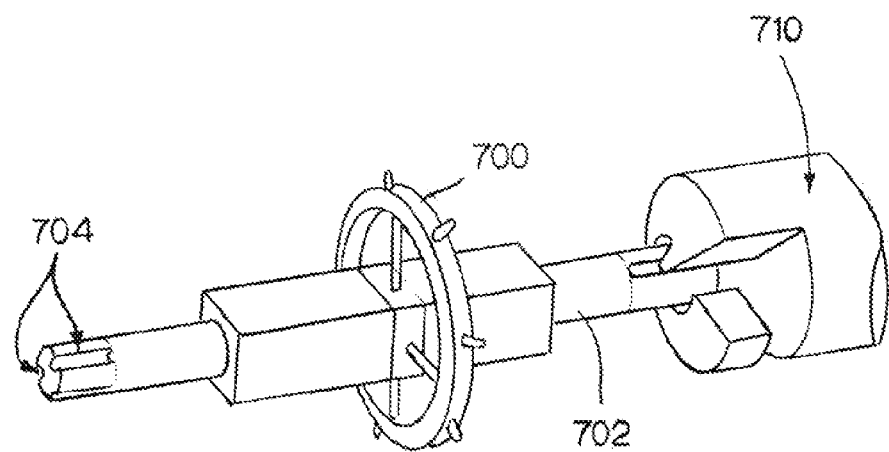
FIG. 36 shows an embodiment of a conveyor sprocket and shaft mounted to a conveyor shaft.

FIG. 36 shows another approach to mounting a conveyor auxiliary component to a conveyor frame. In the embodiment of FIG. 36, an auxiliary component, shown as a sprocket 700 mounted on or integrally formed with a shaft portion 702, includes grooves 704 on end portions for mounting the component to a conveyor frame member 710. The conveyor frame member 710 includes flexible portions for snapping around the shaft 702.

Figure 37:
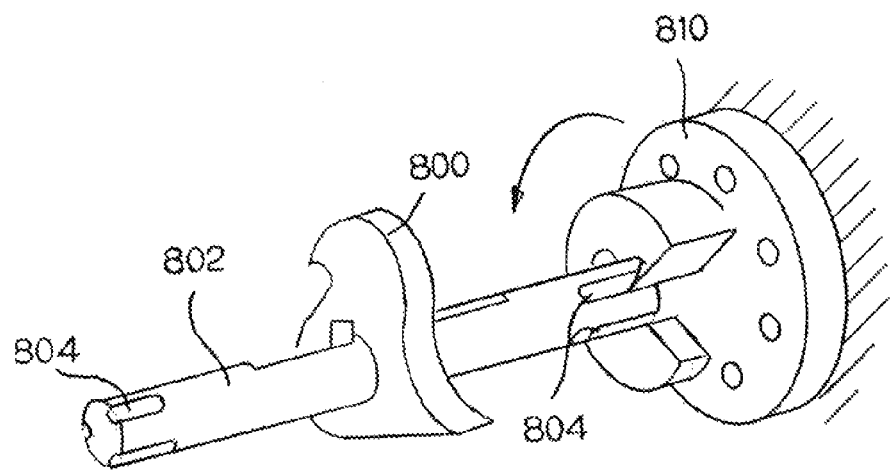
FIG. 37 shows an embodiment of a position limiter and shaft mounted to a conveyor frame component.

As shown in FIG. 37, the shaft portion 802 of the auxiliary component can be round instead of square, or have any other suitable shape. The auxiliary component 800 of FIG. 37 comprises a position limiter, though the invention is not so limited. The shaft portion 802 includes grooves for mounting to a conveyor frame member 810 by an interference fit with grooves 804.

A snap clamp comprising a collar, a barbed tip and a protrusion on the barbed tip may be used to mount any suitable component to a toolbar shaft having a channel for receiving the protrusion. For example, other snap-on components that may be mounted to a toolbar, such as toolbars 10a, 10b, include other conveyor auxiliary component, such as rollers at transition points from an incline to horizontal for guiding the belt. The guide rollers contact upper edges of the belt and may snap to a toolbar using a snap clamp or other locking device. Other examples of components in a conveyor that may be mounted using the snap clamp or other snap-on design include, but are not limited to snap on clean-in-place nozzles or clean-in-place sanitation rails, snap on conduit brackets, snap on hangers for standard "j" belt lifters, snap on product chutes, snap on diverting arms, snap on photo-eyes, snap on covers, snap on drip pans, snap on cutting boards, and others components.

In addition, the illustrative snap-on design may be used to configure a wide conveyor.

Furthermore, alternatives to a snap clamp may be used to mount any suitable auxiliary conveyor component to a conveyor frame member.

The use of lock-in-place components for a conveyor frame, particularly the illustrative snap-clamp design, ensures a secure connection with minimal rotation of the component about the toolbar and no axial movement, if desired. The components are easy to deploy, reconfigurable, reusable, resulting in a sanitary, versatile conveyor.

As shown in FIG. 38, the conveyor frame 2' may include sanitary wheels 140 for portability.

Although the invention has been described with reference to specific versions, other versions are possible. The scope of the invention is not meant to be limited to the exemplary versions described above.

What is claimed is:

1. A conveyor frame, comprising:
   a first longitudinally-extending toolbar extending from a first end to a second end and including a channel on an outer surface;
   a plurality of brackets connected to the first longitudinally-extending toolbar;
   support structure for the toolbar; and
   an auxiliary component mounted to the first longitudinally-extending toolbar using a snap clamp comprising a collar having a curved inner surface and a first tip, the first tip including a protrusion configured to mate with the channel.

2. The conveyor frame of claim 1, further comprising a second longitudinally-extending toolbar parallel to the first longitudinally-extending toolbar, with the plurality of brackets extending between the first and second longitudinally-extending toolbars.

3. The conveyor frame of claim 1, wherein the collar forms a pair of legs, a first leg terminating in the first tip and a second leg terminating in a second tip.

4. The conveyor frame of claim 3, further comprising a tab extending between a radially inner surface of the first leg and the protrusion.

5. The conveyor frame of claim 4, wherein the first longitudinally-extending toolbar includes an axial notch for engaging the tab.

6. The conveyor frame of claim 1, further comprising a laterally-extending toolbar inserted in a bracket and an auxiliary component mounted to the laterally-extending toolbar using a snap clamp.

7. A conveyor frame, comprising:
   a first toolbar comprising a shaft and a channel extending longitudinally along at least a portion of the shaft perimeter;
   an auxiliary component mounted to the toolbar using a snap clamp, the snap clamp comprising a collar having an inner surface, a first tip and a second tip, the second tip including a protrusion configured to mate with the channel.

8. The conveyor frame of claim 7, wherein the second tip further includes a tab extending between the inner surface and the protrusion and the first toolbar includes an axial notch for receiving the tab.

9. The conveyor frame of claim 7, wherein the inner surface has a smaller radius of curvature than the outer surface of the first toolbar in a relaxed state and stretches to match the radius of curvature of the toolbar in a stretched state to mount the collar to the first toolbar.

10. The conveyor frame of claim 7, wherein the inner surface has a larger radius of curvature than the outer surface of the first toolbar in a relaxed state and compresses to match the radius of curvature of the toolbar in a stretched state to mount the collar to the first toolbar.

11. The conveyor frame of claim 7, further comprising a connector extending between the auxiliary component and the snap clamp.

12. The conveyor frame of claim 7, wherein the auxiliary component comprises one of a sprocket, an infeed shoe, a wearstrip, a wearstrip lock, a returnway roller, a sidewall, a containment block, a side guard, and a position limiter.

13. A conveyor frame, comprising:
   a first longitudinally-extending toolbar extending from a first end to a second end;
   a plurality of brackets connected to the first longitudinally-extending toolbar;
   support structure for the first longitudinally-extending toolbar; and
   an auxiliary component mounted to the first longitudinally-extending toolbar using a snap clamp, wherein the snap clamp comprises an opening including opposing protrusions having sloped faces, wherein the opening flexes to allow insertion of the first longitudinally-extending toolbar.

14. A conveyor frame, comprising:
   a first longitudinally-extending toolbar extending from a first end to a second end;
   a plurality of brackets connected to the first longitudinally-extending toolbar;

support structure for the first longitudinally-extending toolbar; and an auxiliary component mounted to the first longitudinally-extending toolbar using a snap clamp, wherein the first longitudinally-extending toolbar includes a cam protrusion and the snap clamp comprises an opening and a wedge-shaped recess adjacent the opening for engaging the cam protrusion.

15. A conveyor frame, comprising:

a first longitudinally-extending toolbar extending from a first end to a second end;

a plurality of brackets connected to the first longitudinally-extending toolbar;

support structure for the first longitudinally-extending toolbar; and an auxiliary component mounted to the first longitudinally-extending toolbar using a snap clamp, wherein snap clamp comprises a stem and foot extending from the stem and the first longitudinally-extending toolbar includes a through hole for receiving the stem and foot.

16. A conveyor frame, comprising:

a first longitudinally-extending toolbar extending from a first end to a second end;

a plurality of brackets connected to the first longitudinally-extending toolbar;

support structure for the first longitudinally-extending toolbar; and an auxiliary component mounted to the first longitudinally-extending toolbar using a snap clamp, wherein the snap clamp comprises a first magnet and the first longitudinally-extending toolbar comprises a second magnet attracted to the first magnet.

* * * * *